United States Patent
Izawa

(10) Patent No.: US 9,432,570 B2
(45) Date of Patent: Aug. 30, 2016

(54) IMAGE PROCESSING DEVICE, IMAGING DEVICE, IMAGE PROCESSING METHOD AND COMPUTER READABLE MEDIUM

(71) Applicant: FUJIFILM Corporation, Tokyo (JP)

(72) Inventor: Katsutoshi Izawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/788,082

(22) Filed: Jun. 30, 2015

(65) Prior Publication Data

US 2015/0304546 A1 Oct. 22, 2015

Related U.S. Application Data

(63) Continuation of application No. PCT/JP2013/079030, filed on Oct. 25, 2013.

(30) Foreign Application Priority Data

Jan. 4, 2013 (JP) .................................. 2013-000045

(51) Int. Cl.
*H04N 5/357* (2011.01)
*H04N 5/232* (2006.01)
(Continued)

(52) U.S. Cl.
CPC ............ *H04N 5/23212* (2013.01); *G02B 7/34* (2013.01); *H04N 5/3572* (2013.01); *H04N 5/3696* (2013.01)

(58) Field of Classification Search
CPC ........... H04N 5/23212; H04N 5/3572; H04N 5/3696; G02B 7/34
See application file for complete search history.

(56) References Cited

U.S. PATENT DOCUMENTS 7,837,330 B2 * 11/2010 Montgomery ......... G03B 35/10 353/7
8,199,209 B2 * 6/2012 Ono ....................... H04N 5/217 348/222.1

(Continued)

FOREIGN PATENT DOCUMENTS

JP 2009-147665 A 7/2009
JP 2011-223562 A 11/2011

(Continued)

OTHER PUBLICATIONS

International Search Report, issued in PCT/JP2013/079030, dated Dec. 3, 2013.

(Continued)

*Primary Examiner* — Twyler Haskins
*Assistant Examiner* — Padma Haliyur
(74) *Attorney, Agent, or Firm* — Birch, Stewart, Kolasch & Birch, LLP

(57) ABSTRACT

A sensitivity acquisition section that acquires sensitivity to light incident through the first region of pixels in a pupil division direction of the first pixel group, and acquires sensitivity to light incident through the second region of pixels in the pupil division direction of the second pixel group; a correction section that derives linearly approximated sensitivity correction coefficients for each of the first image and the second image based on the sensitivities, and corrects the brightness of the first and second images based on the derived sensitivity correction coefficients; and a generation section that generates a first display image based on an image signal output from the image pick-up device, and generates a second display image for use in focus verification based on the first and second images corrected by the correction section.

13 Claims, 33 Drawing Sheets

(51) Int. Cl.
*G02B 7/34* (2006.01)
*H04N 5/369* (2011.01)

(56) References Cited

U.S. PATENT DOCUMENTS

| | | | | |
|---|---|---|---|---|
| 8,514,303 | B2* | 8/2013 | Wach | H04N 5/335 348/241 |
| 8,593,509 | B2* | 11/2013 | Iwasaki | G03B 35/08 348/46 |
| 2009/0153693 | A1 | 6/2009 | Onuki et al. | |
| 2011/0234861 | A1 | 9/2011 | Endo | |
| 2012/0050497 | A1 | 3/2012 | Suto | |
| 2013/0278730 | A1 | 10/2013 | Hasegawa et al. | |

FOREIGN PATENT DOCUMENTS

| | | |
|---|---|---|
| JP | 2012-75079 A | 4/2012 |
| WO | WO 2012/036019 A1 | 3/2012 |

OTHER PUBLICATIONS

Written Opinion of the International Searching Authority, issued in PCT/JP2013/079030, dated Dec. 3, 2013.

* cited by examiner

FIG.19
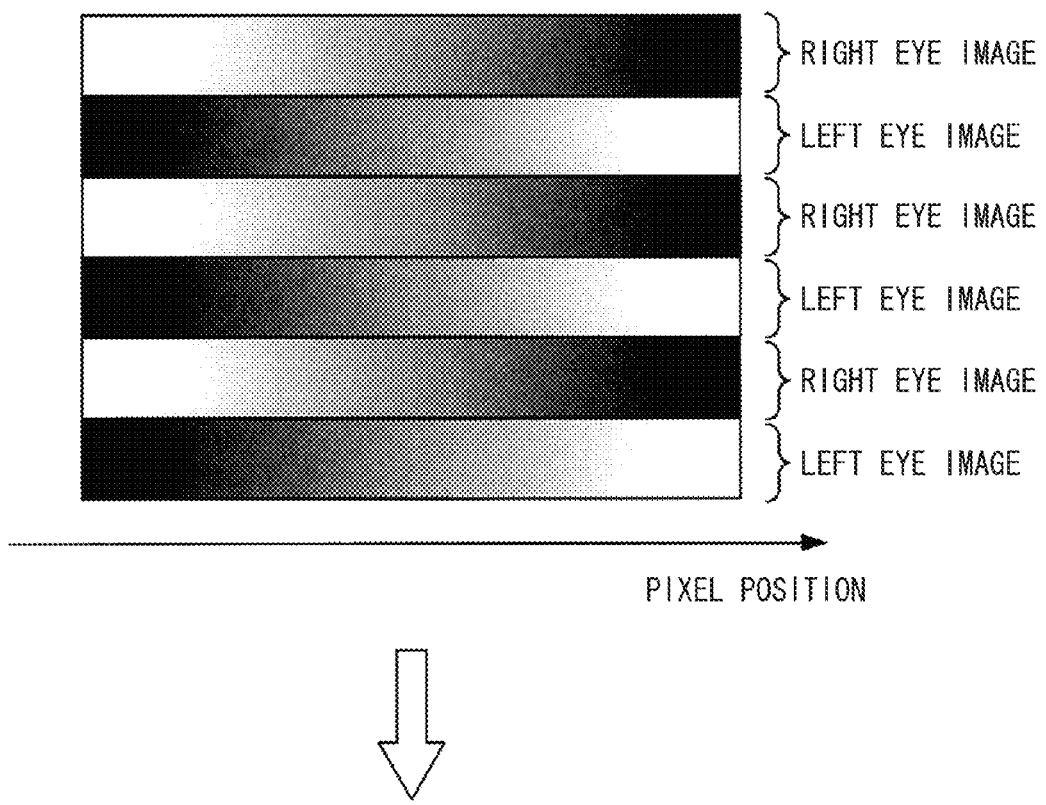
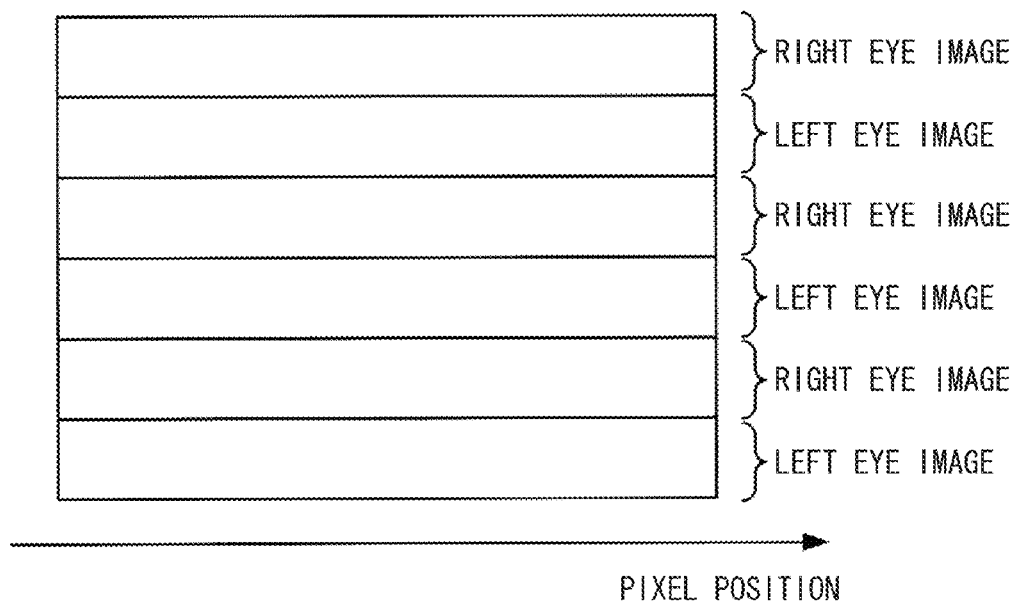

FIG.21
AT F2.0
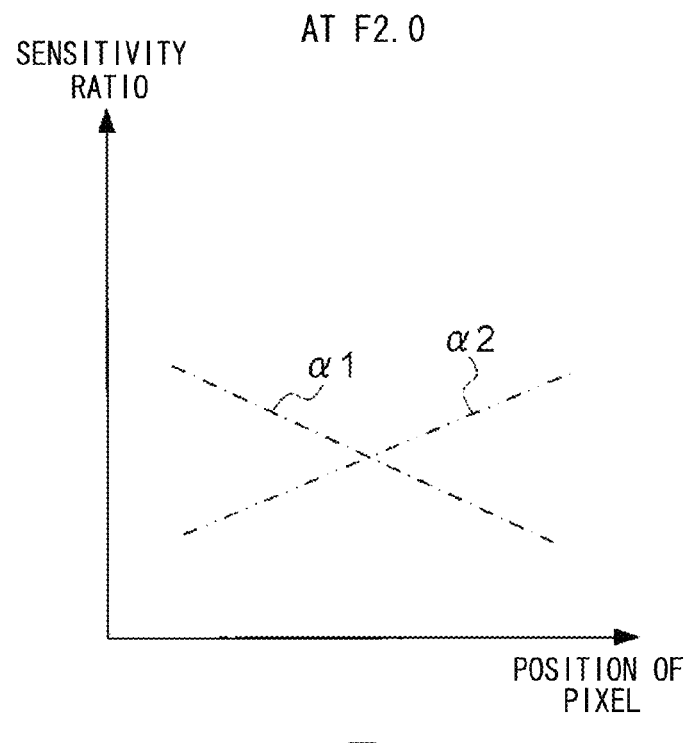
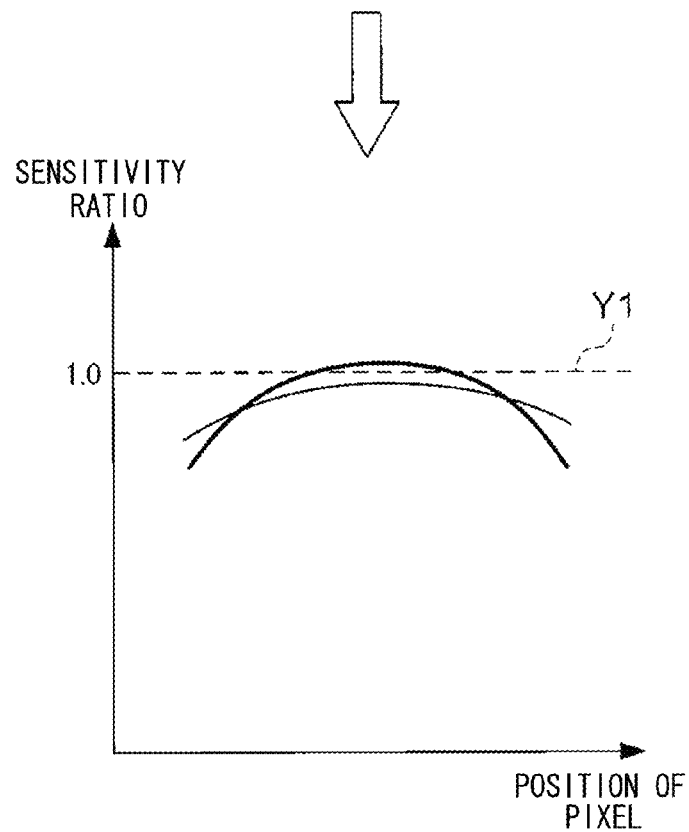

FIG.22
AT F5.6
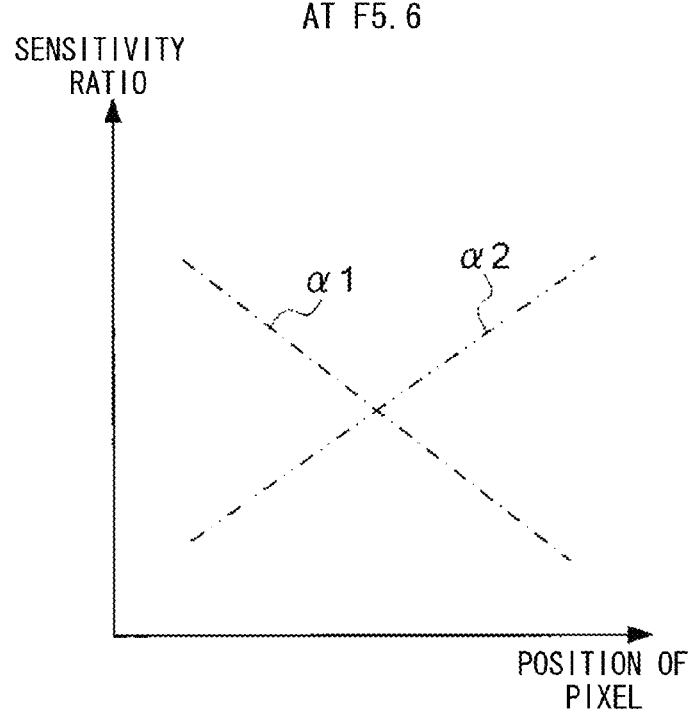
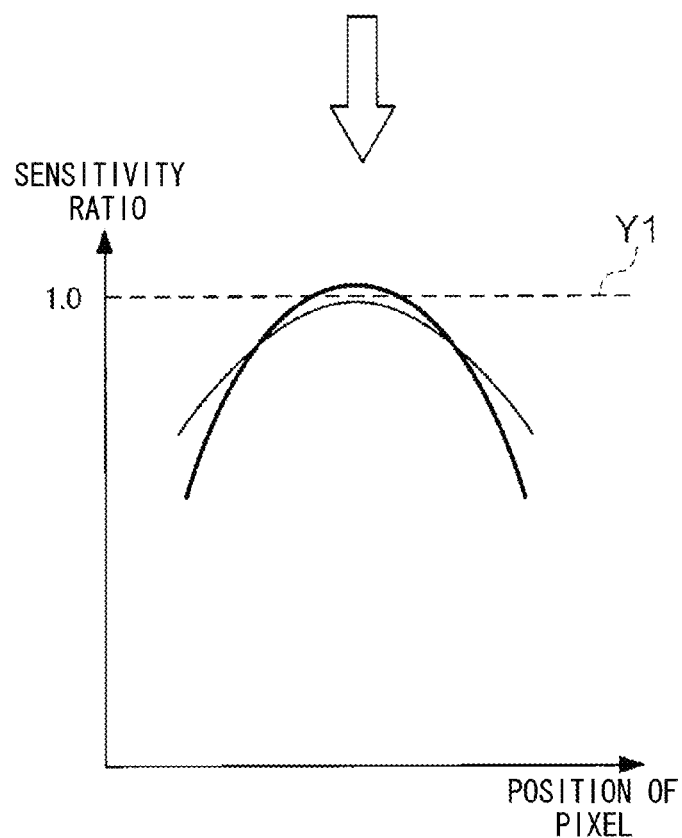

FIG.23
AT F5.6
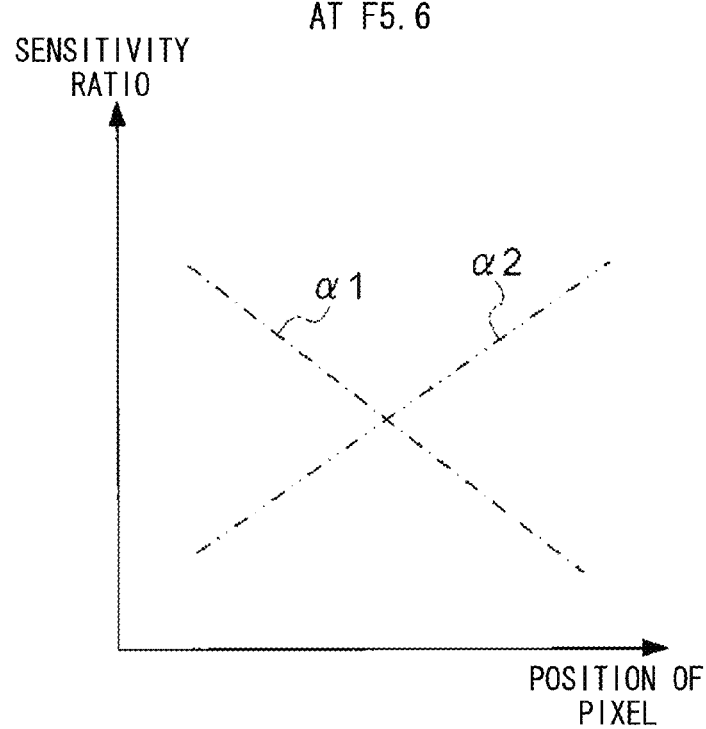
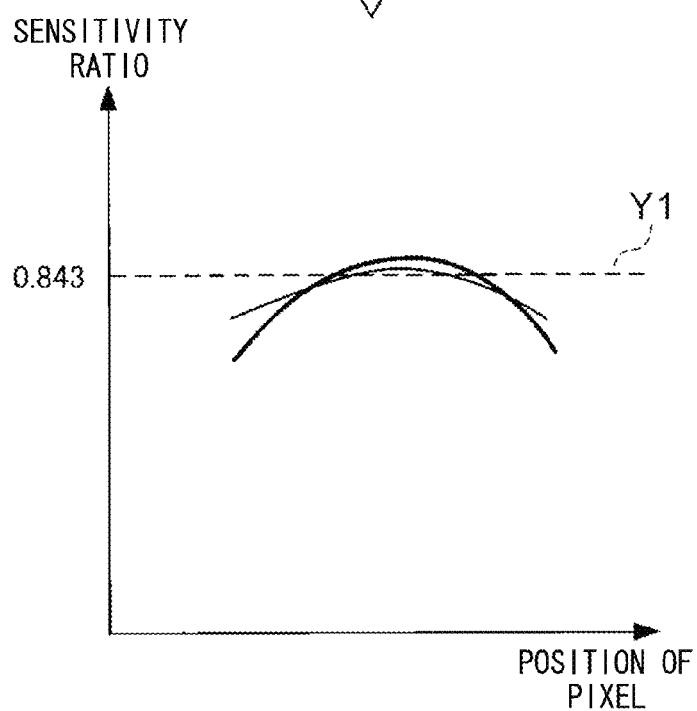

IMAGE PROCESSING DEVICE, IMAGING DEVICE, IMAGE PROCESSING METHOD AND COMPUTER READABLE MEDIUM

CROSS-REFERENCE TO RELATED APPLICATIONS

This application is a continuation application of International Application No. PCT/JP2013/079030, filed Oct. 25, 2013, the disclosure of which is incorporated herein by reference in its entirety. Further, this application claims priority from Japanese Patent Application No. 2013-000045, filed Jan. 4, 2013, the disclosure of which is incorporated herein by reference in its entirety.

BACKGROUND

1. Technical Field

The present invention relates to an image processing device, an imaging device, an image processing method, and a computer readable medium.

2. Background Art

Digital cameras are widely known that are provided with autofocus, in which phase difference detection methods and contrast detection methods are employed, and also what is referred to as a manual focus mode, in which a user can manually perform focus adjustment.

Digital cameras including a manual focus mode are known in which a reflex mirror is provided to enable focus adjustment while checking a subject-image, and a method is utilized in which a split microprism screen is employed to display the phase difference visually. Utilization of a method in which contrast is checked visually is also known.

However, in digital cameras with the reflex mirror omitted that have become prevalent in recent years, since there is no reflex mirror, there is no method to check the subject-image while displaying the phase difference, and contrast detection methods have had to be relied on. However, in such cases, contrast cannot be displayed at a resolution greater than that of a display device, such as a Liquid Crystal Display (LCD), requiring adoption of methods such as enlarging a portion for display.

In recent years, therefore, a split-image is displayed within a live-view image (also referred to as a through image), so as to make the work of focusing on the subject-image easier for an operator when in manual focus mode. Split-image refers to a divided image in which, for example, a display region has been divided into plural sections (such as each image divided in the up-down direction), and in which displacement is imparted in the parallax generation direction (such as the left-right direction) according to focus misalignment, and is a divided image in which the displacement in the parallax generation direction disappears in an in-focus state. The operator (such as a photographer) operates a manual focus ring (hereafter referred to as a "focus ring") to match the focus so that displacement of the split-image (such as each image divided in the up-down direction) is removed.

In the imaging device described in JP-A No. 2009-147665 (referred to below as "Patent Document 1"), out of light rays from an imaging optical system, a first subject-image and a second subject-image formed by light rays divided by a pupil divider are photoelectrically converted to generate a first image and a second image, respectively. The first and the second images are employed to generate a split-image, and a third subject-image formed by the light rays not divided by the pupil divider is photoelectrically converted to generate a third image. The third image is displayed on a display and the generated split-image is displayed inside the third image, and color data extracted from the third image is applied to the split-image. By applying color data extracted from the third image to the split-image in this way, excellent visibility of the split-image can be achieved.

In the imaging device described in JP-A No. 2011-223562 (referred to below as Patent Document 2), light that has passed through different regions in the left-right direction of an imaging optical system is received, images from left and right viewpoints are acquired by photoelectrical conversion, and shooting correction is performed on the images from left and right viewpoints by applying different shooting correction amounts to the left and right viewpoint images.

In the imaging device described in JP-A No. 2012-75079 (referred to below as Patent Document 3), different shooting correction is applied to left and right viewpoint images that have been captured using a single imaging optical system so as to reduce the brightness difference between the left and right viewpoint images.

The imaging device described in WO 2012/036019 (referred to below as Patent Document 4) includes a two dimensional correction table for correcting shooting with a lens, and a one dimensional correction table for correcting shooting by monocular 3D.

Technical Problem

However, although a split-image is normally displayed continuously in a live-view, due to the combined presence of images with different characteristics, referred to as normal images and phase difference images, in such cases, separate individual image processing is required on the respective images, resulting in a large processing load. Impairment of the real-timeliness of display due to performing image processing with such a large processing load is a concern. Namely, prolonging the time between imaging and displaying the images obtained by imaging, and reduction in the number of frames of images that can be displayed in a unit of time, is a concern. There is accordingly a need for simple image processing to secure the real-timeliness of display of split-images.

SUMMARY

In consideration of the above circumstances, an object of the present invention is to provide an image processing device, an imaging device, an image processing method and an image processing program capable of securing the real-timeliness of display of an image for use as a focusing image by using a simple configuration.

Solution To Problem

In order to achieve the above object, an image processing device according to a first aspect of the present invention includes: an image acquisition section that acquires first and second images based on first and second image signals output from an image pick-up device including first and second pixel groups outputting the first and second image signals due to respective images being formed by a pupil-divided subject-image that has passed through first and second regions of an imaging lens; a sensitivity acquisition section that acquires sensitivity to light incident through the first region of pixels in a pupil division direction of the first pixel group, and acquires sensitivity to light incident through the second region of pixels in the pupil division direction of the second pixel group; a correction section that derives linearly approximated sensitivity correction coefficients for each of the first image and the second image based on the sensitivities acquired by the sensitivity acquisition section, and corrects the brightness of the first and second images based on the derived sensitivity correction coefficients; a generation section that generates a first display image based on an image signal output from the image pick-up device, and generates a second display image for use in focus verification based on the first and second images corrected by the correction section; a display section that displays images; and a display controller that performs control to continuously display the first display image generated by the generation section as a video image on the display section, and to continuously display the second display image generated by the generation section as a video image within a display region of the first display image. This thereby enables, by using a simple configuration, better real-timeliness of display of an image for use as a focusing image to be secured than in cases lacking the present configuration.

In order to achieve the above object, an image processing device according to a second aspect of the present invention includes: an image acquisition section that acquires first and second images based on first and second image signals output from an image pick-up device including first and second pixel groups outputting the first and second image signals due to respective images being formed by a pupil-divided subject-image that has passed through first and second regions of an imaging lens; a sensitivity acquisition section that acquires sensitivity to light incident through the first region of pixels at at least both end portions in a pupil division direction of the first pixel group, and acquires sensitivity to light incident through the second region of pixels in the pupil division direction of the second pixel group; a correction section that derives linearly approximated sensitivity correction coefficients for each of the first image and the second image based on the sensitivities acquired by the sensitivity acquisition section, and corrects the brightness of the first and second images based on the derived sensitivity correction coefficients; a generation section that generates a first display image based on an image signal output from the image pick-up device, and generates a second display image for use in focus verification based on the first and second images corrected by the correction section; a display section that displays images; and a display controller that performs control to inhibit continuous display of the first display image generated by the generation section as a video image using the display section, and to continuously display on the display section the second display image generated by the generation section as a video image. This thereby enables, by using a simple configuration, better real-timeliness of display of an image for use as a focusing image to be secured than in cases lacking the present configuration.

A third aspect of the present invention is the first aspect or second aspect of the present invention, wherein the sensitivity correction coefficients are used to make a sensitivity difference between corresponding pixels included in a center portion in the pupil division direction of each of the first and second pixel groups smaller than a sensitivity difference between corresponding pixels included in both end portions in the pupil division direction of each of the first and second pixel groups. This thereby enables, by using a simple configuration, the difference in brightness between pixels in the images for use in focus verification included in the center portion in a direction corresponding to the pupil division direction to be made less than the difference in brightness at both end portions, by a greater extent than in cases lacking the present configuration.

A fourth aspect of the present invention is any one of the first aspect to the third aspect of the present invention, wherein the correction section uses the sensitivity correction coefficients to correct the brightness of the first and second images acquired by the image acquisition section, and adjusts the corrected brightness by multiplying by a specific coefficient. This thereby, by using a simple configuration, enables the overall brightness of the images for use in focus verification to be made closer to a target brightness than in cases lacking the present configuration.

A fifth aspect of the present invention is any one of the first aspect to the fourth aspect of the present invention, wherein the correction section derives the sensitivity correction coefficients based on an imaging condition, and employs the derived sensitivity correction coefficients to correct the brightness of the first and second images acquired by the image acquisition section. This thereby enables divergence of brightness of the images for use in focus verification from a target brightness due to an imaging condition to be suppressed more than in cases not employing sensitivity correction coefficients that have been derived based on an imaging condition.

A sixth aspect of the present invention is the fifth aspect of the present invention, wherein the correction section derives the sensitivity correction coefficients in consideration of a target sensitivity determined based on the imaging condition, and uses the derived sensitivity correction coefficients to correct the brightness of the first and second images acquired by the image acquisition section. This thereby enables, by using a simple configuration, divergence of brightness of the images for use in focus verification from a target brightness due to an imaging condition to be suppressed more than in cases lacking the present configuration.

A seventh aspect of the present invention is the sixth aspect of the present invention, wherein: the imaging condition is an aperture number; and in a state in which the sensitivity correction coefficients have been pre-derived in consideration of the target sensitivity for each of plural predetermined aperture numbers, in cases in which first and second images are acquired by the image acquisition section based on an aperture number other than the plurality of aperture numbers, the correction section interpolates the sensitivity correction coefficients for between at least 2 aperture numbers in the plurality of aperture numbers, and uses the sensitivity correction coefficients after interpolation to correct the brightness of the first and second images acquired by the image acquisition section. This thereby enables divergence of the brightness of the images for use in focus verification from the target brightness due to aperture number to better be suppressed than in cases lacking the present configuration, even in cases in which the aperture number is set as a step-less continuum.

An eighth aspect of the present invention is any one of the first aspect to the seventh aspect of the present invention, wherein the sensitivity acquisition section acquires the sensitivities of plural pixels included in a center portion in the pupil division direction of each of the first and second pixel groups. This thereby enables the brightness of the central portion of the images for use in focus verification to be corrected with higher precision than in cases in which sensitivities of plural pixels included in the central portion in the pupil division direction are not acquired in each of the first and second pixel groups.

A ninth aspect of the present invention is any one of the first aspect to the eighth aspect of the present invention, wherein: the image pick-up device further includes a third pixel group, on which an image of a subject-image that has passed through the imaging lens is formed without being pupil-divided, and that outputs a third image signal; and the generation section generates the first display image based on the third image signal output from the third pixel group. This thereby enables, using a simple configuration, the quality of the first display image to be improved compared to cases lacking the present configuration.

In order to achieve the above object, an imaging device according to a tenth aspect of the present invention includes: the image processing device of any one of the first aspect to the ninth aspect; the image pick-up device including the first and second pixel groups; and a storage section that stores images generated based on image signals output from the image pick-up device. This thereby enables, by using a simple configuration, better real-timeliness of display of images for use as a focusing image to be secured than in cases lacking the present configuration.

In order to achieve the above object, an image processing method according to an eleventh aspect of the present invention includes: acquiring first and second images based on first and second image signals output from an image pick-up device including first and second pixel groups outputting the first and second image signals due to respective images being formed by a pupil-divided subject-image that has passed through first and second regions of an imaging lens; acquiring sensitivity to light incident through the first region of pixels in a pupil division direction of the first pixel group, and acquiring sensitivity to light incident through the second region of pixels in the pupil division direction of the second pixel group; deriving linearly approximated sensitivity correction coefficients for each of the first image and the second image based on the acquired sensitivities, and correcting the brightness of the first and second images based on the derived sensitivity correction coefficients; generating a first display image based on an image signal output from the image pick-up device, and generating a second display image for use in focus verification based on the corrected first and second images; and performing control to continuously display the generated first display image as a video image on a display section that displays images, and to continuously display the generated second display image as a video image within a display region of the first display image. This thereby enables, by using a simple configuration, better real-timeliness of display of an image for use as a focusing image to be secured than in cases lacking the present configuration.

In order to achieve the above object, an image processing method according to a twelfth aspect of the present invention includes: acquiring first and second images based on first and second image signals output from an image pick-up device including first and second pixel groups outputting the first and second image signals due to respective images being formed by a pupil-divided subject-image that has passed through first and second regions of an imaging lens; acquiring sensitivity to light incident through the first region of pixels in a pupil division direction of the first pixel group, and acquiring sensitivity to light incident through the second region of pixels in the pupil division direction of the second pixel group; deriving linearly approximated sensitivity correction coefficients for each of the first image and the second image based on the acquired sensitivities, and correcting the brightness of the first and second images based on the derived sensitivity correction coefficients; generating a first display image based on an image signal output from the image pick-up device, and generating a second display image for use in focus verification based on the corrected first and second images; and performing control to inhibit continuous display of the generated first display image as a video image using a display section, and to continuously display on the display section the generated second display image as a video image. This thereby enables, by using a simple configuration, better real-timeliness of display of an image for use as a focusing image to be secured than in cases lacking the present configuration.

In order to achieve the above object, an image processing program according to a thirteenth aspect of the present invention causes a computer to function as the image acquisition section, the sensitivity acquisition section, the correction section, and the display controller of the image processing device of any one of the first to the ninth aspect of the present invention. This thereby enables, by using a simple configuration, better real-timeliness of display of an image for use as a focusing image to be secured than in cases lacking the present configuration.

Advantageous Effects Of Invention

The present invention exhibits the advantageous effect of enabling the real-timeliness of display of an image for use as a focusing image to be secured using a simple configuration.

BRIEF DESCRIPTION OF DRAWINGS

FIG. 19 is schematic diagram illustrating an example of the influence of light reduction characteristics on a right eye image and a left eye image before and after correction.

FIG. 21 is a graph illustrating an example of first and second linear approximations employed when sensitivity ratios are corrected without considering aperture number in a state set at F2.0, and a graph illustrating an example of sensitivity ratios after correction.

FIG. 22 is a graph illustrating an example of first and second linear approximations employed when sensitivity ratios are corrected without considering aperture number in a state set at F5.6, and a graph illustrating an example of sensitivity ratios after correction.

FIG. 23 is a graph illustrating an example of first and second linear approximations employed when sensitivity ratios are corrected while considering aperture number in a state set at F5.6, and a graph illustrating an example of sensitivity ratios after correction.

DESCRIPTION OF EMBODIMENTS

Explanation follows regarding examples of exemplary embodiments of an imaging device according to the present invention, with reference to the drawings.

First Exemplary Embodiment

Figure 1:
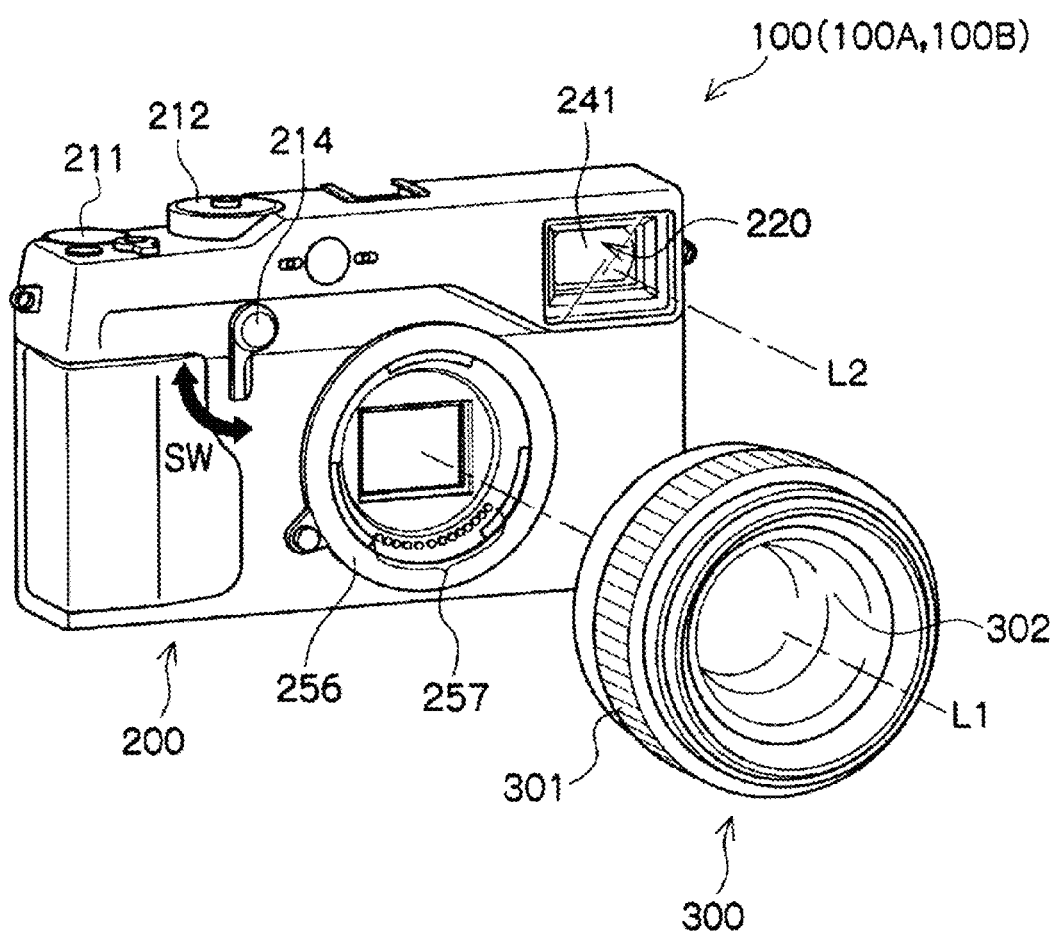
FIG. 1 is a perspective view illustrating an example of an external appearance of an interchangeable lens camera that is an imaging device according to a first to a third exemplary embodiment.
Figure 2:
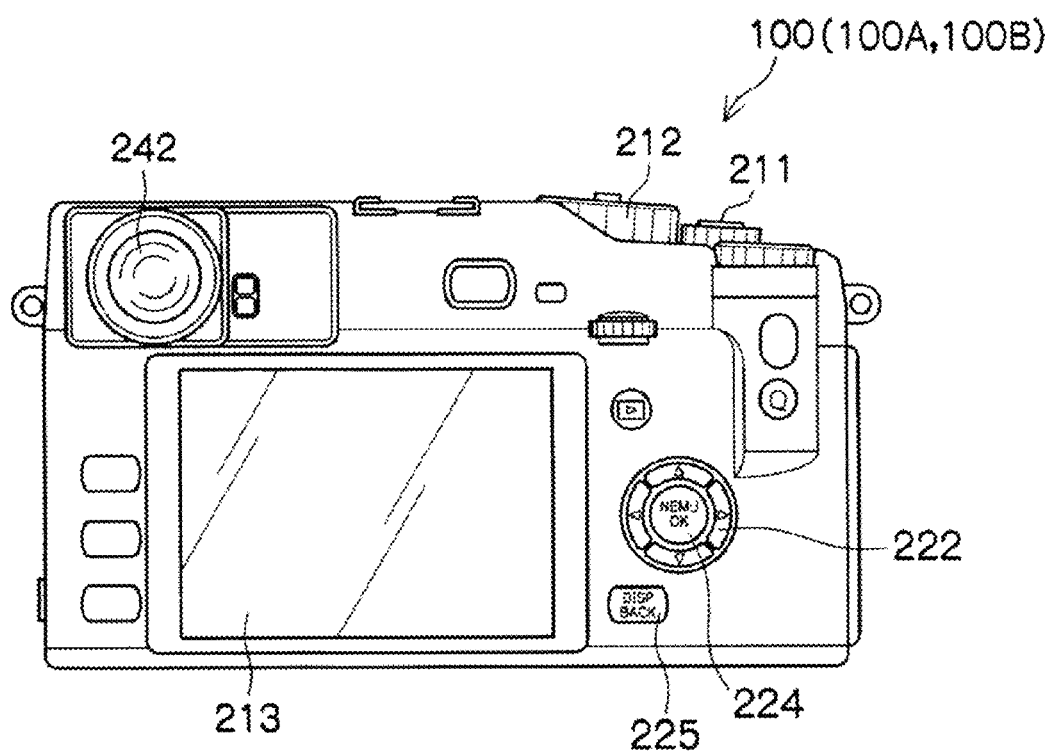
FIG. 2 is a back view illustrating the back face side of the imaging device illustrated in FIG. 1.

FIG. 1 is a perspective view illustrating an example of an external appearance of an imaging device 100 according to a first exemplary embodiment. FIG. 2 is a back view of the imaging device 100 illustrated in FIG. 1.

The imaging device 100 is an interchangeable lens camera. Moreover, the imaging device 100 is a digital camera with a camera body 200 and an interchangeable lens 300 that is interchangeably mounted to the camera body 200, and without a reflex mirror. The interchangeable lens 300 includes imaging lenses 16 that include a focusing lens 302 capable of being moved along the optical axis direction by manual operation (see FIG. 3). A HYBRID FINDER (registered trademark) 220 is also provided to the camera body 200. The HYBRID FINDER 220 indicates, for example, a finder selectively employed as an optical viewfinder (referred to as "OVF" below), or as an electronic viewfinder (referred to as "EVF" below)

The interchangeable lens 300 is interchangeably mounted to the camera body 200. A focus ring 301 is provided to a mirror cylinder of the interchangeable lens 300. The focusing lens 302 is moved in the optical axis direction as the focus ring 301 is rotationally operated by hand, such that subject light forms an image on an image pick-up device 20 (see FIG. 3), described later, at an in-focus position according to the subject distance.

An OVF finder window 241 included in the HYBRID FINDER 220 is provided on the front face of the camera body 200. A finder switching lever (finder switching section) 214 is also provided on the front face of the camera body 200. Switching (described below) is performed between an optical image visible with the OVF and an electronic image visible with the EVF (live-view image) by turning the finder switching lever 214 in the directions of the arrows SW. The optical axis L2 of the OVF is different from the optical axis L1 of the interchangeable lens 300. The top face of the camera body 200 is mainly provided with a release button 211 and a dial 212 to set imaging mode, replay mode, and the like.

The release button 211 serving as an imaging preparation instruction section and an imaging instruction section is configured capable of detecting two stages of press operation: an imaging preparation instruction state and an imaging instruction state. The imaging preparation instruction state indicates, for example, a state pressed from a standby position to an intermediate position (half pressed position). The imaging instruction state indicates a state pressed past the intermediate position to the final press position (full press position). In the following a "state pressed from the standby position to the half pressed position" is referred to as a "half pressed state", and "a state pressed from the standby position to the fully pressed position" is referred to as the "fully pressed state".

In the imaging device 100 according to the first exemplary embodiment, adjustment of imaging conditions is performed by placing the release button 211 in the half pressed state, and then light exposure (imaging) is performed by continuing to the fully pressed state. Examples of imaging conditions include the exposure state and the focusing state. In the imaging device 100 according to the first exemplary embodiment, the exposure state and the focusing state are adjusted as adjustment to the imaging conditions. Namely, after setting an exposure state (shutter speed and aperture state) by actuating an Automatic Exposure (AE) function by placing the release button 211 in the half pressed state, an Auto Focus (AF) function is then actuated to control focus.

The back face of the camera body 200 is provided with an OVF finder eyepiece 242, a display section 213, a directional pad 222, a MENU/OK key 224, and a BACK/DISP button 225.

The directional pad 222 functions as a multifunction key to output various instruction signals, such as selection of one or plural menus, zoom, and frame advance. The MENU/OK key 224 is an operation key that functions as a menu button to instruct display of one or plural menus on the screen of the display section 213, and also doubles as an OK button function to confirm selected content, to instruct execution, or the like. The BACK/DISP button 225 is used when erasing a desired object, such as a selected item, erasing specified content, or returning to the one-previous operation state, and so on.

The display section 213 is implemented for example by an LCD, and is employed to display a live-view image (through image) that is an example of successive frame images obtained by imaging successive frames during an imaging mode. The display section 213 is also employed to display a still image that is an example of a single frame image obtained by imaging a single frame in cases in which an instruction for still image capture has been given. Moreover, the display section 213 may be employed to display a reproduced image in a reproduction mode, and to display menu screens and the like.

Figure 3:
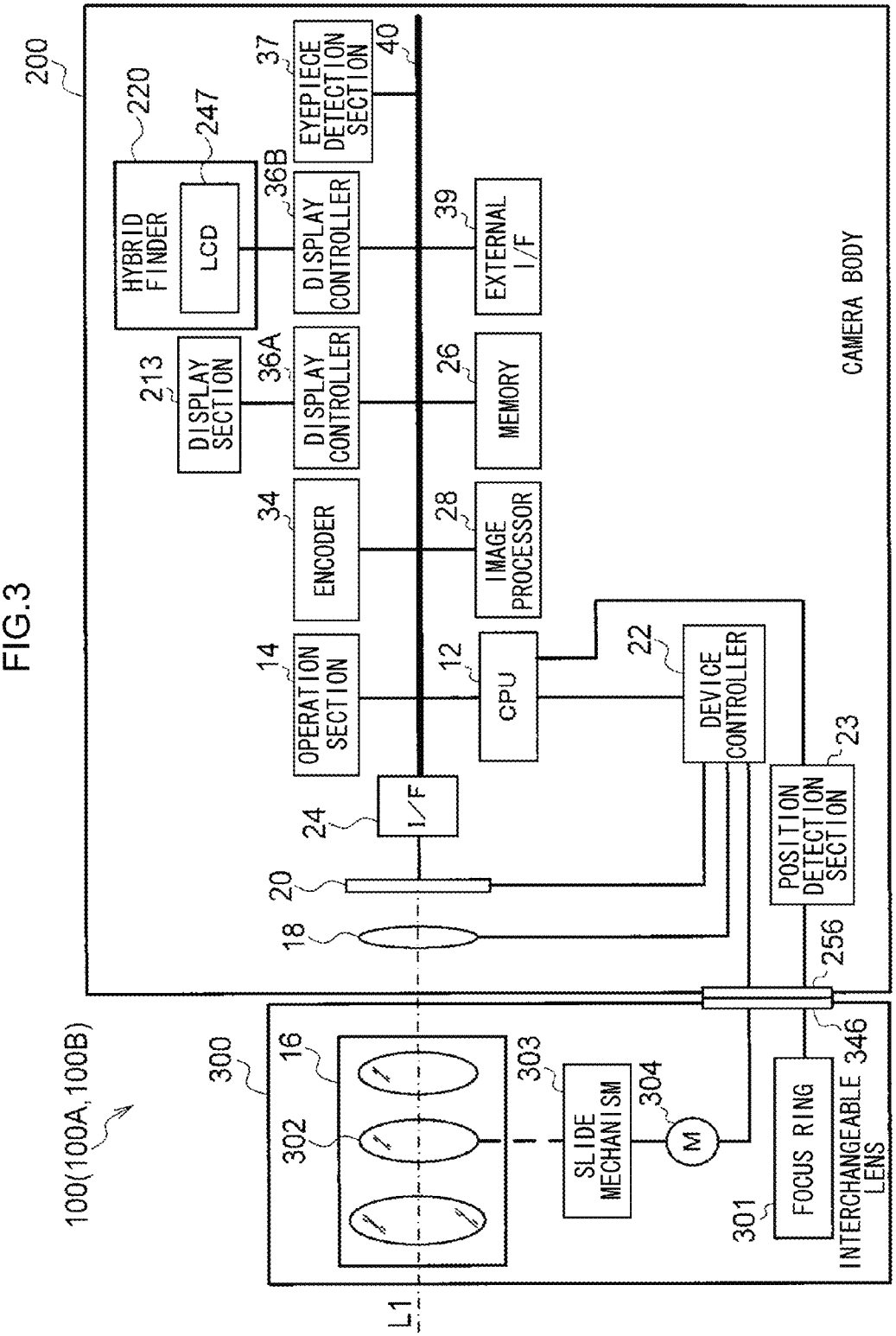
FIG. 3 is a block diagram illustrating an example of a configuration of an electrical system of an imaging device according to the first to the third exemplary embodiments.

FIG. 3 is a block diagram illustrating an example of a configuration (internal configuration) of an electrical system of the imaging device 100 according to the first exemplary embodiment.

The imaging device 100 includes a mount 256 provided to the camera body 200, and a mount 346 on the interchangeable lens 300 side that corresponds to the mount 256. The interchangeable lens 300 is interchangeably mounted to the camera body 200 by connecting the mount 346 to the mount 256.

The interchangeable lens 300 includes a slide mechanism 303 and a motor 304. The slide mechanism 303 moves the focusing lens 302 along the optical axis L1 direction by operation of the focus ring 301. The focusing lens 302 is attached to the slide mechanism 303 so as to be capable of sliding in the optical axis L1 direction. The motor 304 is connected to the slide mechanism 303, and the slide mechanism 303 slides the focusing lens 302 along the optical axis L1 direction on receipt of motive force from the motor 304.

The motor 304 is connected to the camera body 200 through the mounts 256, 346, and driving is controlled under instruction from the camera body 200. In the first exemplary embodiment a stepping motor is employed as an example of the motor 304. The motor 304 operates in synchronization with pulse power under command from the camera body 200.

The imaging device 100 is a digital camera that records still images and video images that have been imaged. Overall operation of the camera is controlled by a central processing unit (CPU) 12. The imaging device 100 includes the CPU 12 as an example of a determination section and a controller of the present invention. The imaging device 100 includes an operation section 14, an interface section 24, memory 26, and an encoder 34. The imaging device 100 includes display control sections 36A, 36B that are examples of display controllers according to the present invention. The imaging device 100 includes an eyepiece detection section 37. The imaging device 100 also includes an image processor 28 that is an example of an image acquisition section, a sensitivity acquisition section, a correction section, and a generation section according to the present invention. When there is no need to discriminate between the display control sections 36A, 36B, they are referred to below as "display control section 36". In the first exemplary embodiment, the display controller 36 is provided as a separate hardware configuration to the image processor 28, however there is no limitation thereto. The image processor 28 may include a function similar to that of the display controller 36, and in such cases the display controller 36 is not required.

The CPU 12, the operation section 14, the interface section 24, the memory 26 that is an example of a storage section, the image processor 28, the encoder 34, the display controllers 36A, 36B, the eyepiece detection section 37, and an external interface (I/F) 39 are connected together through a bus 40. The memory 26 includes a non-volatile storage region (for example EEPROM or the like) stored with parameters, programs, and the like, and a volatile storage region (for example SDRAM or the like) temporarily stored with various data related to images and the like.

In the imaging device 100 according to the first exemplary embodiment, the CPU 12 performs focusing control by controlling the driving of a focus adjustment motor such that the contrast value of the image obtained by imaging is at a maximum. The CPU 12 computes AE data that is physical data indicating the brightness of the image obtained by imaging. When the release button 211 is in the half pressed state, the CPU 12 derives the shutter speed and the F number according to the brightness of the image indicated by the AE data. The exposure state is then set by controlling the relevant sections such that the derived shutter speed and F number are achieved.

The operation section 14 is a user interface operated by an operator when giving various instructions to the imaging device 100. Various instructions received by the operation section 14 are output to the CPU 12 as operation signals, and the CPU 12 executes processing according to the operation signals input from the operation section 14.

The operation section 14 includes the release button 211, the dial 212 for selecting imaging modes and the like, a display section 213, the finder switching lever 214, the directional pad 222, the MENU/OK key 224, and the BACK/DISP button 225. The operation section 14 includes a touch panel for receiving various information. The touch panel is, for example, superimposed on the display screen of the display section 213.

The camera body 200 includes a position detection section 23. The position detection section 23 is connected to the CPU 12. The position detection section 23 is connected to the focus ring 301 through the mounts 256, 346, detects the angle of rotation of the focus ring 301, and outputs rotation angle data representing the rotation angle of the detection result to the CPU 12. The CPU 12 executes processing according to rotation angle data input from the position detection section 23.

When the imaging mode has been set, image light representing a subject-image is formed as an image on a light receiving face of the color image pick-up device (for example a CMOS sensor) 20 through the imaging lenses 16 that include the focusing lens 302 that is movable by manual operation, and a shutter 18. The signal charges accumulated in the image pick-up device 20 are read in sequence as digital signals according to the signal charges (voltage) arising due to application of a read signal from a device controller 22. The image pick-up device 20 has what is referred to as an electronic shutter function, and the charge accumulation time (shutter speed) of each photosensor is controlled by the timing of the read signals by operating the electronic shutter function. The image pick-up device 20 according to the first exemplary embodiment is a CMOS image sensor, however there is no limitation thereto, and a CDD image sensor may be employed.

Figure 4:
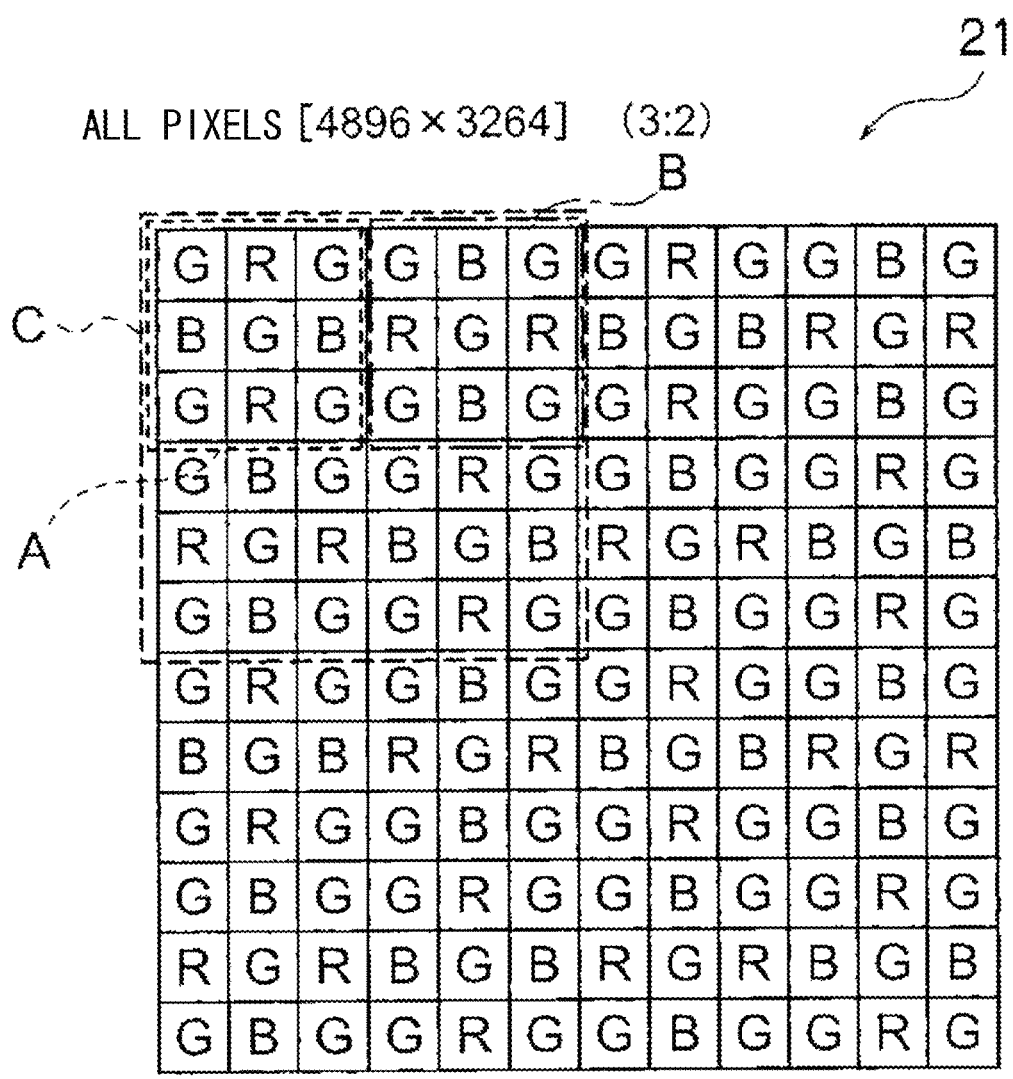
FIG. 4 is a schematic layout diagram illustrating an example of placement of a color filter provided to an image pick-up device included in an imaging device according to the first to the third exemplary embodiments.

A color filter 21 provided as an example to the image pick-up device 20 is illustrated in FIG. 4. FIG. 4 schematically illustrates an example of an array of the color filter 21. In the example illustrated in FIG. 4, (4896×3264) pixels are employed as an example of the number of pixels, and 3:2 is applied as the aspect ratio; however, the number of pixels and the aspect ratio are not limited thereto. As in the example illustrated in FIG. 4, the color filter 21 includes a first filter G corresponding to green (G) that contributes most to obtaining the brightness signal, a second filter R corresponding to red (R), and a third filter B corresponding to blue (B). The array pattern of the first filter G (referred to below as G filter), the second filter R (referred to below as R filter), and the third filter B (referred to below as B filter) is classified into a first array pattern A and a second array pattern B.

In the first array pattern A, the G filter is placed on the 4 corner pixels and center pixel of a 3×3 pixel square array. In the first array pattern A, the R filter is placed in the vertical line at the row direction (for example the horizontal direction) center of the square array. In the first array pattern A, the B filter is placed in the horizontal line at the column direction (for example the vertical direction) center of the square array. In the second array pattern B, the placement of the filter G is the same as that of the first basic array pattern A, and the placement of the filter R and the placement of the B filter are in a swapped over pattern. The color filter 21 includes a basic array pattern C formed from a square array pattern corresponding to 6×6 pixels. The basic array pattern C is a 6×6 pixel pattern disposed with the first array pattern A and the second array pattern B so as to have point symmetry, with the basic array pattern C disposed repeating in both the row direction and the column direction. Namely, in the color filter 21 each of the color filters R, G, B (the R filter, G filter, B filter) is arrayed with a specific periodicity. This thereby enables processing to be performed according to a repeating pattern during performing synchronization (interpolation) processing and the like on the R, G, B signals read from the color image pick-up device.

Moreover, when images are reduced by thinning processing in basic array pattern C units, the color filter array of the thinning processed reduced images can be made similar to the color filter array prior to thinning processing, enabling a common processing circuit to be employed.

The color filter 21 has the G filter corresponding to the color contributing the most to obtaining a brightness signal (the color G in the first exemplary embodiment) placed in each line in the row direction, column direction and diagonal directions of the color filter array. This thereby enables the reproduction precision of synchronization processing to be raised in high frequency regions, irrespective of the high frequency direction.

The color filter 21 has the R filter and the B filter corresponding to the two or more other colors other than the G color (the R and B colors in the first exemplary embodiment) placed in each line in the row direction and column direction of the color filter array. This thereby enables color moiré (false color) generation to be suppressed, thereby enabling an optical low pass filter for suppressing false color generation to be omitted from placement on the optical path of the optical system from the incident face to the imaging plane. Moreover, even in cases in which an optical low pass filter is employed, one can be employed that has a weak action to cut the high frequency components to prevent false color generation, enabling deterioration of resolution to be avoided.

The basic array pattern C can be considered as an array of alternate first array pattern A and second array pattern B in the row direction and column direction, wherein the first array pattern A is the 3×3 pixels surrounded by the frame of the dashed line, and the second array pattern B is the 3×3 pixels surrounded by the frame of the dash-dotted intermittent line.

The first array pattern A and the second array pattern B both have the G filters that are the respective brightness system pixels placed at their 4 corners and center, so as to be placed along their two diagonals. Moreover, in the first array pattern A, the B filters are arrayed in the row direction on each side of the central G filter, and the R filters are arrayed in the column direction on each side of the central G filter. However, in the second array pattern B, the R filters are arrayed in the row direction on each side of the central G filter, and the B filters are arrayed in the column direction on each side of the central G filter. Namely, the first array pattern A and the second array pattern B have reverse positional relationships to each other for the R filters and the B filters, but have the same placement otherwise.

Figure 5:
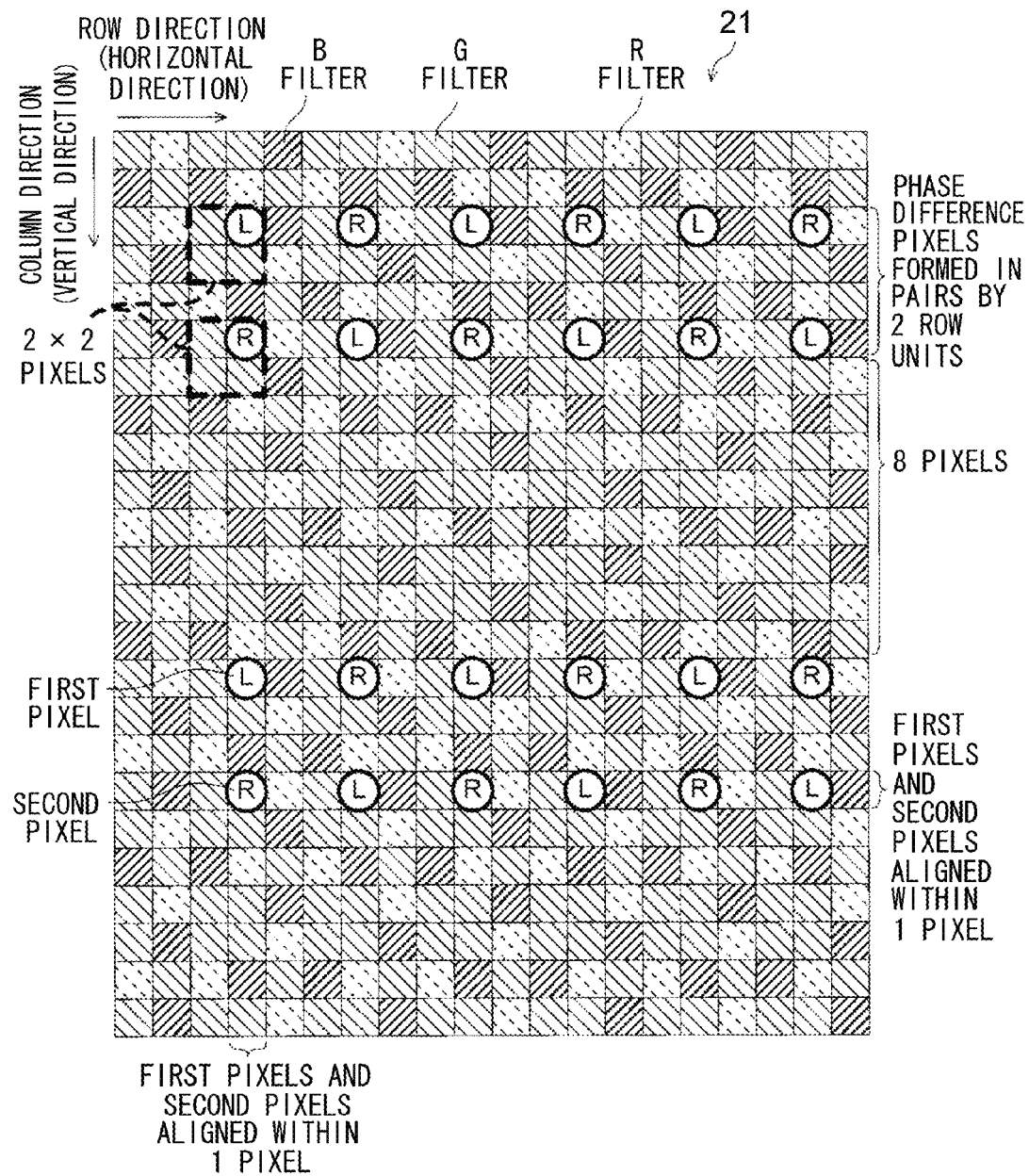
FIG. 5 is a schematic configuration diagram illustrating an example of placement of phase difference pixels in an image pick-up device included in an imaging device according to the first to the third exemplary embodiments.

The imaging device 100 includes a phase difference AF function. The image pick-up device 20 includes plural pixels for phase difference detection, employed when the phase difference AF function operates. The plural pixels for phase difference detection are placed in a predetermined pattern. As illustrated in the example of FIG. 5, the pixels employed for phase difference detection are first pixels L having the left half portion in the row direction of the pixel blocked, or second pixels R having the right half portion in the row direction of the pixel blocked. When, in the following explanation, there is no need to discriminate between the first pixels L and the second pixels R, they are called phase difference pixels.

Figure 6:
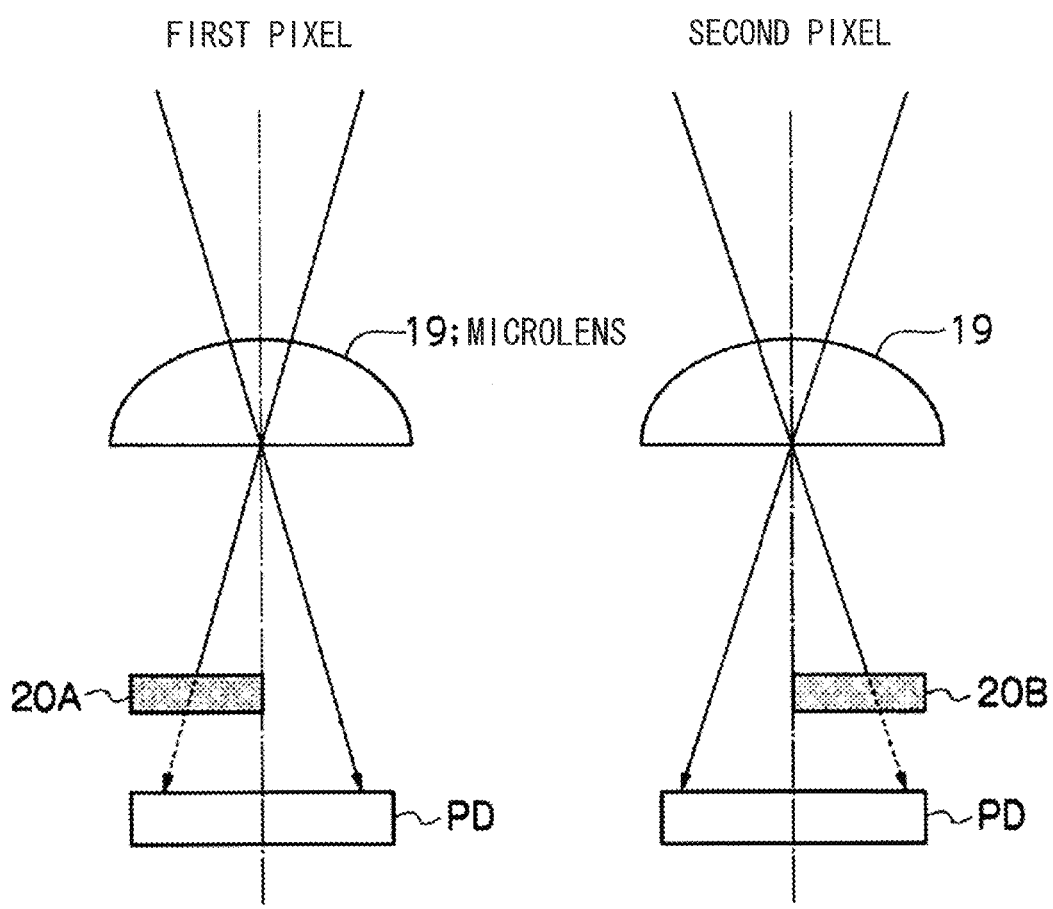
FIG. 6 is a schematic configuration diagram illustrating an example of a configuration of phase difference pixels (a first pixel and a second pixel) included in an image pick-up device of an imaging device according to the first to the third exemplary embodiments.

As illustrated in the example of FIG. 6, the first pixels L each include a light-blocking member 20A, and the second pixels R each include a light-blocking member 20B. The light-blocking members 20A are provided at the front face side of a photodiode PD (microlens 19 side), and block light to the left half portion of each of the light receiving faces (the left side when looking at the subject-image from the light receiving face (in other words the right side when looking at the light receiving face from the subject-image)). The light-blocking members 20B are provided at the front face side of a photodiode PD, and block light to the right half portion of the light receiving faces (the right side when looking at the subject-image from the light receiving face (in other words the left side when looking at the light receiving face from the subject-image)).

The microlens 19 and the light-blocking members 20A, 20B function as a pupil divider, and the first pixels L receive light only from light rays passing through an exit pupil of imaging lenses 16 on the left side of the optical axis, the second pixels R receive light only from light rays passing through the exit pupil of the imaging lenses 16 on the right side of the optical axis. Thus the light rays passing through the exit pupil are divided to the left and right by the microlens 19 and the light-blocking members 20A, 20B serving as a pupil divider, and are respectively incident to the first pixels L and the second pixels R.

Portions in-focus (in a focused state), out of the subject-image corresponding to the light rays of the left half portion and the subject-image corresponding to the light rays on the right half portion among the light rays passing through the exit pupil of the imaging lenses 16, are focused at the same position on the image pick-up device 20. Conversely, portions in focus in front or in focus behind are incident to different respective positions on the image pick-up device 20 to each other (with displaced phase). This thereby enables a parallax image (left eye image, and right eye image, described below) to be acquired with different parallax for the subject-image corresponding to the light rays of the left half portion, and the subject-image corresponding to the light rays of the right half portion.

The imaging device 100 detects a phase displacement amount based on pixel values of the first pixels L and pixel values of the second pixels R by operating the phase difference AF function. The focal position of the imaging lens is then adjusted according to the detected phase displacement amount. Note that in the following, reference numerals are not appended when explanation does not need to discriminate between the light-blocking members 20A, 20B and they are referred to collectively as "light-blocking members".

The image pick-up device 20 is classified into a first pixel group, a second pixel group, and a third pixel group. The first pixel group indicates, for example, the plural first pixels L. The second pixel group indicates, for example, the plural second pixels R. The third pixel group indicates, for example, the plural normal pixels (an example of third pixels). Reference here to "normal pixels" means, for example, pixels other than the phase difference pixels (for example pixels without light-blocking members). In the following a RAW image output from the first pixel group is referred to as a "first image", a RAW image output from the second pixel group is referred to as a "second image", and a RAW image output from the third pixel group is referred to as a "third image".

Each of the pixels included in the first and second pixel groups are placed such that the first pixel group and the second pixel group are positioned aligned within 1 pixel of each other in the row direction. Moreover, each of the pixels included in the first pixel group and the second pixel group are placed such that the first pixel group and the second pixel group are positioned aligned within 1 pixel of each other in the column direction. In the example illustrated in FIG. 5, the first pixels L and the second pixels R are placed alternately to each other in a straight line shape along the row direction and the column direction, with a spacing of plural pixels worth between each other.

In the example illustrated in FIG. 5, the positions of each of the pixels included in the first pixel group and the second pixel group are positioned aligned within 1 pixel of each other in both the row direction and the column direction; however the positions may be positioned so as to fall within a specific number of pixels (for example within 2 pixels) of each other in at least one of the row direction and the column direction. In order to suppress to the maximum extent the occurrence of image misalignment caused by factors other than misaligned focus, however, as illustrated in the example in FIG. 5, preferably each of the pixels included in the first and second pixel groups are positioned aligned with each other so as to fall within 1 pixel in both the row direction and the column direction.

The phase difference pixels are, as illustrated in the example in FIG. 5, provided to pixels of the square array of G filters corresponding to 2×2 pixels. Namely, in the example of FIG. 5, phase difference pixels are allocated to the pixels at the top right corner of the 2×2 pixels of G filters as viewed face-on in the diagrams. Normal pixels are also placed between the phase difference pixels, with normal pixels allocated to the remaining pixels in the 2×2 pixels of G filters. Moreover, in the example illustrated in FIG. 5, the rows of phase difference pixels of first pixels L and second pixels R alternately placed along the row direction are configured in pairs of 2-row units, placed such that there is a separation of a specific number of pixels between the pairs (8 pixels in the example in FIG. 5) in the column direction.

In this manner, in the color filter 21, the light-blocking members are provided to the pixels at the top right corner of the 2×2 pixels of G filters, with the phase difference pixels regularly placed along the column direction and the row direction with plural pixel separations therebetween. Thus, since there are comparatively many normal pixels placed at the periphery of the phase difference pixels, the interpolation precision can be raised in cases in which pixel values of the phase difference pixels are interpolated from the pixel values of the normal pixels. Moreover, each of the pixels included in the first to the third pixel groups are placed so that each of the normal pixels employed for interpolation of phase difference pixels are not employed more than once, enabling a further improvement in interpolation precision to be expected.

Returning to FIG. 3, the image pick-up device 20 outputs the first image (digital signal representing the pixel values of each of the first pixels L) from the first pixel group, and outputs the second image (digital signal representing the pixel values of each of the second pixels R) from the second pixel group. The image pick-up device 20 outputs the third image (digital signal representing the pixel values of each of the normal pixels) from the third pixel group. The third image output from the third pixel group is a chromatic image, and is, for example, a color image with the same color array as the array of the normal pixels. The first image, the second image, and the third image output from the image pick-up device 20 are temporarily stored in the volatile storage region in the memory 26 through the interface section 24.

Figure 7:
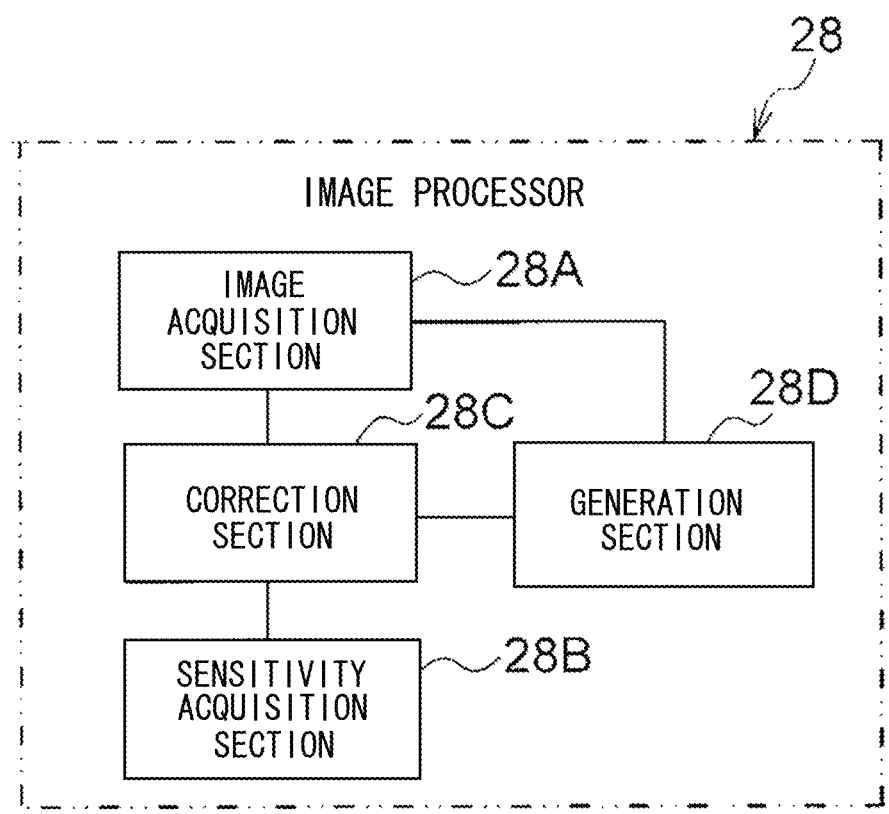
FIG. 7 is a functional block diagram illustrating an example of relevant functions of an image processor included in an imaging device according to the first to the third exemplary embodiments.

The image processor 28 performs various image processing on the first to third images stored in the memory 26. As illustrated in the example of FIG. 7, the image processor 28 includes an image acquisition section 28A, a sensitivity acquisition section 28B, a correction section 28C, and a generation section 28D. The image processor 28 is implemented by plural functional circuits related to image processing configured as a single integrated circuit that is an Application Specific Integrated Circuit (ASIC). However, the hardware configuration is not limited thereto, and another hardware configuration may be employed, for example a programmable logic device, or a computer including a CPU, ROM, and RAM.

The image acquisition section 28A acquires the first image and the second image output from the image pick-up device 20. The sensitivity acquisition section 28B acquires sensitivity of pixels in the pupil division direction to light incident to the first pixel group through a first region. The sensitivity acquisition section 28B also acquires sensitivity of pixels in the pupil division direction to light incident to the second pixel group through the second region. "Pixels in the pupil division direction" denotes each of plural pixels arrayed in the pupil division direction.

The correction section 28C derives linearly approximated sensitivity correction coefficients for each of the first image and the second image, based on the sensitivities acquired by the sensitivity acquisition section 28B, and corrects the brightness of the first and second images based on the derived sensitivity correction coefficients. In the first exemplary embodiment, as the sensitivity correction coefficients, sensitivity correction coefficients are employed that represent the slope of a linear trend in sensitivity change to make the sensitivity difference between corresponding pixels of each of the first and second pixel groups included in a center portion in the pupil division direction smaller than the sensitivity difference between corresponding pixels of each of the first and second pixel groups included in both end portions in the pupil division direction. However, the present invention is not limited thereto, and any sensitivity correction coefficient may be employed that at least makes the sensitivity of the pixels in the pupil division direction closer to a target sensitivity after correction than before correction for each of the first and second pixel groups.

Reference here to "corresponding pixels" denotes, for example, pixels where the position in the pupil division direction of the first pixel group and the position in the pupil division direction of the second pixel group match each other. Reference here to "central portion" denotes a range of a number of pixels of the respective first and second pixel groups that is equivalent to half the number of pixels in the pupil division direction, centered on the center in the pupil division direction. Reference here to "both end portions" denotes, for example, locations in each of the first and second pixel groups outside of the central portion in the pupil division direction. Reference here to "the sensitivity difference between corresponding pixels included in a center portion" denotes, for example, the sensitivity difference between pixels of each of the first and second pixel groups at representative positions (for example, the pupil division direction center) included in the center portion in the pupil division direction. Reference here to "the sensitivity difference between corresponding pixels included in both end portions" denotes, for example, the sensitivity difference between pixels of each of the first and second pixel groups at representative positions included in portions outside [other than?] the center portion in the pupil division direction (for example, at both ends in the pupil division direction).

Figure 8:
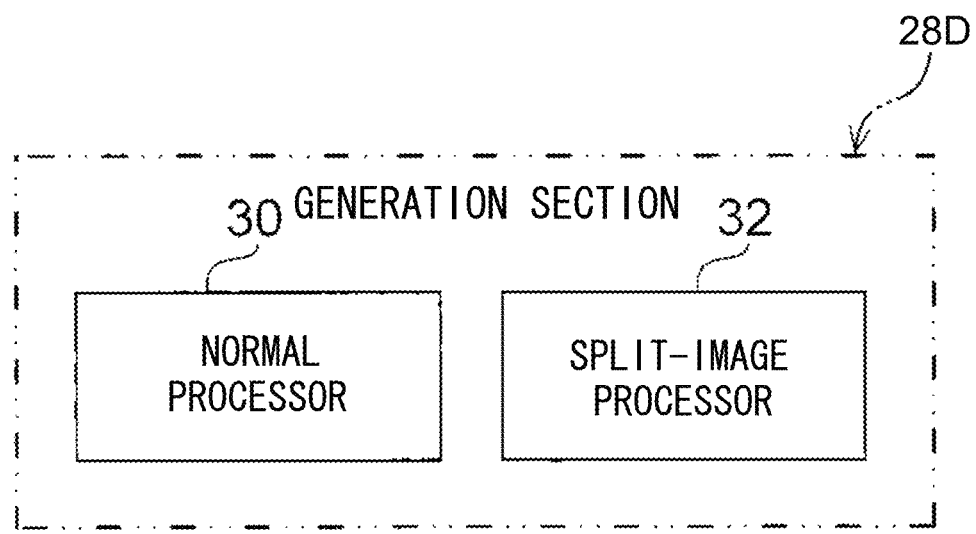
FIG. 8 is a functional block diagram illustrating an example of relevant functions of a generating section included in an imaging device according to the first to the third exemplary embodiments.

The generation section 28D generates a first display image based on a third image output from the image pick-up device 20, and generates a second display image employed for focus verification based on the first and second images that have been corrected by the sensitivity acquisition section 28B. As illustrated in the example in FIG. 8, the generation section 28D includes a normal processor 30 and a split-image processor 32. The normal processor 30 generates a chromatic normal image, serving as an example of a first display image, by processing the R, G, B signals corresponding to the third pixel group. The split-image processor 32 generates an achromatic split-image, serving as an example of a second display image, by processing the G signals corresponding to the first pixel group and the second pixel group.

Returning to FIG. 3, the encoder 34 converts the input signal into a signal of another format and outputs the converted signal. The HYBRID FINDER 220 includes an LCD 247 that displays an electronic image. The number of pixels in a specific direction in the LCD 247 (for example the number of pixels in the row direction that is the parallax generation direction), is less than the number of pixels in the same direction of the display section 213. The display controller 36A is connected to the display section 213, the display controller 36B is connected to the LCD 247, and images are displayed on the LCD 247 or the display section 213 by selectively controlling the LCD 247 and the display section 213. In the following, when there is no need to discriminate between the display section 213 and the LCD 247, they are referred to collectively as "display devices".

The imaging device 100 according to the first exemplary embodiment is configured to be switchable between a manual focus mode and an autofocus mode using the dial 212 (the focus mode switching section). When one of the focus modes has been selected, the display controller 36 displays on the display devices a live-view image onto which the split-images have been synthesized. Moreover, when the autofocus mode has been selected using the dial 212, the CPU 12 operates as a phase difference detection section and an automatic focal point adjusting section. The phase difference detection section detects the phase difference between the first image output from the first pixel group and the second image output from the second pixel group. The automatic focal point adjusting section controls the motor 304 from the device controller 22 through the mounts 256, 346, based on the detected phase displacement, to move the focusing lens 302 to the in-focus position such that the defocus amount of the focusing lens 302 becomes zero. The "defocus amount" referred to above indicates, for example, a phase displacement amount between the first image and the second image.

The eyepiece detection section 37 detects a person (for example a photographer) looking into the finder eyepiece 242, and outputs the detection result to the CPU 12. The CPU 12 is accordingly able to ascertain, based on the detection result of the eyepiece detection section 37, whether or not the finder eyepiece 242 is being used.

The external I/F 39 is connected to a communication network, such as a Local Area Network (LAN) or the internet, and transmission and reception of various data between external devices (for example a printer) and the CPU 12 is achieved through the communication network. When connected to a printer as an external device, the imaging device 100 is accordingly capable of outputting captured still images to a printer and printing. When connected to a display as an external device, the imaging device 100 is capable of outputting captured still images and live-view images to a display, and displaying thereon.

Figure 9:
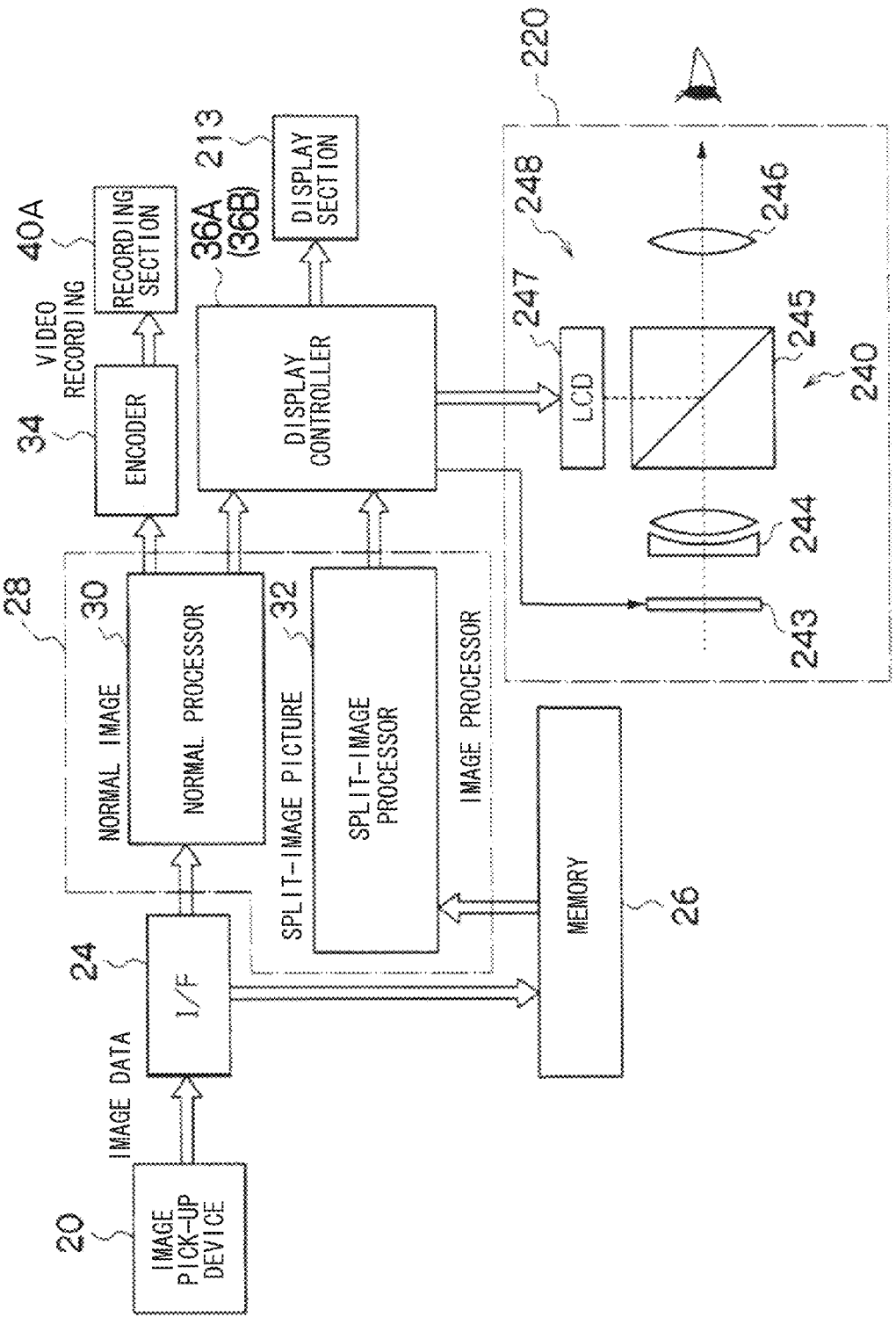
FIG. 9 is a functional block diagram illustrating an example of relevant functions of an imaging device according to the first to the third exemplary embodiments.

FIG. 9 is a functional block diagram illustrating an example of relevant functions of the imaging device 100 according to the first exemplary embodiment. Common portions to the block diagram illustrated in FIG. 3 are appended with the same reference numerals.

The normal processor 30 and the split-image processor 32 each include a WB gain section, a gamma correction section, and a synchronization processor (not illustrated in the drawings), and perform serial signal processing in each of the processors on the digital signals (RAW images) originally temporarily stored in the memory 26. Namely, the WB gain section executes white balance (WB) by adjusting the gain of the R, G, B signals. The gamma correction section gamma corrects each of the R, G B signals for which WB has been executed by the WB gain section. The synchronization processor performs color interpolation processing corresponding to the color filter array of the image pick-up device 20, and generates synchronized R, G, B signals. The normal processor 30 and the split-image processor 32 perform parallel image processing on the RAW images each time one screen's worth of RAW image is acquired by the image pick-up device 20.

Figure 10:
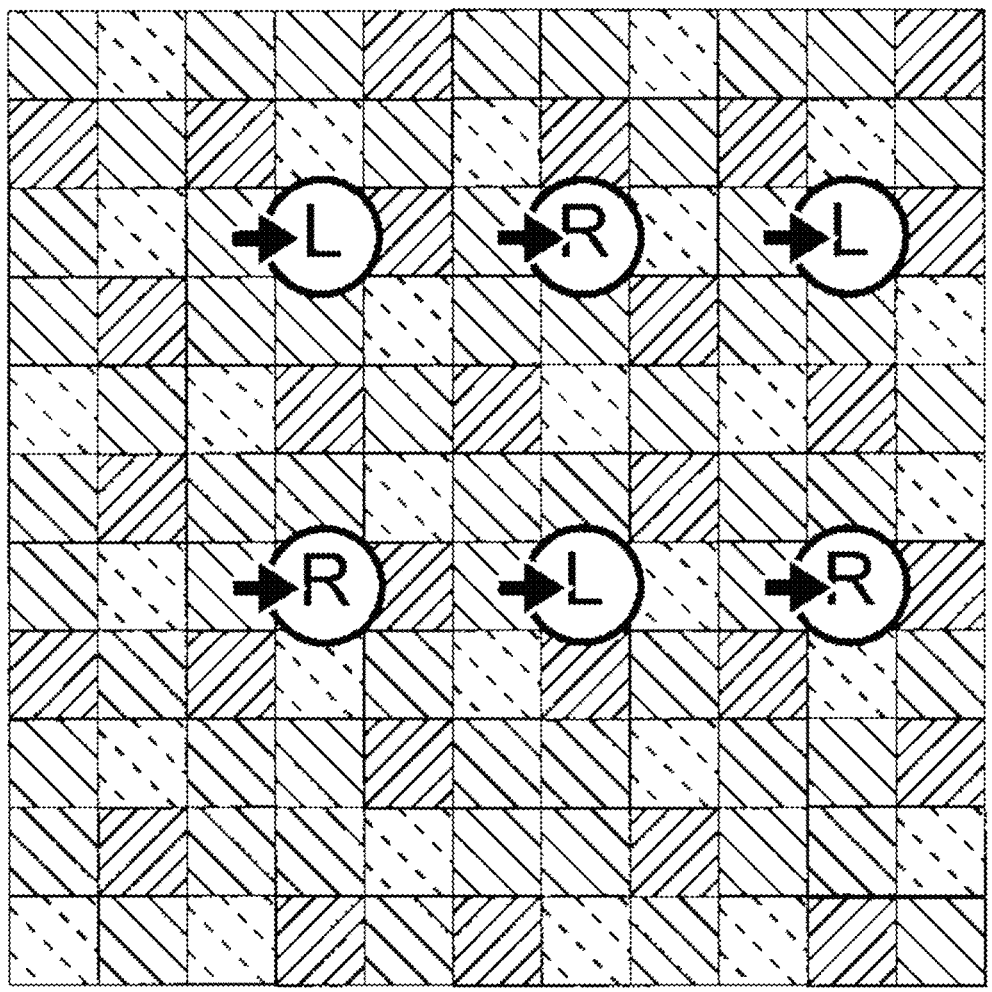
FIG. 10 is a schematic diagram illustrating an example of a way in which phase difference pixels in an image processing device included in an imaging device according to the first to the third exemplary embodiments are interpolated using normal pixels.

The normal processor 30 is input with the R, G, B RAW images from the interface section 24, and, as illustrated in the example in FIG. 10, generates R, G, B pixels for the third pixel group by interpolation using peripheral pixels of the same color out of [among?] the first pixel group and the second pixel group (for example the adjacent G pixels). This thereby enables a normal image for recording to be generated based on the third image output from the third pixel group.

The normal processor 30 outputs image data of the generated normal image for recording to the encoder 34. The R, G, B signals processed by the normal processor 30 are converted (encoded) by the encoder 34 into a recording signal and recorded in a recording section 40A. Moreover, a normal image for display that is an image based on the third image processed by the normal processor 30 is output to the display controller 36. In the following, for convenience of explanation, when there is no need to discriminate between the "normal image for recording" and the "normal image for display" the words "for recording" and the words "for display" are omitted, and they are referred to collectively as "normal images".

The image pick-up device 20 is capable of changing the respective exposure conditions of the first pixel group and the second pixel group (for example, the shutter speed with the electronic shutter), and thereby capable of acquiring images under different exposure conditions at the same time. Consequently, the image processor 28 is capable of generating images over a wide dynamic range based on the images under different exposure conditions. Moreover, due to being able to acquire plural images under the same exposure conditions at the same time, adding these images together enables a high sensitivity image with little noise to be generated, or a high resolution image to be generated.

The split-image processor 32 extracts the G signals of the first pixel group and the second pixel group from the RAW images temporarily stored in the memory 26, and generates an achromatic split-image based on the G signals of the first pixel group and the second pixel group. The pixel groups corresponding to both the first pixel group and the second pixel group extracted from the RAW images are pixel groups from the G filter pixels as described above. The split-image processor 32 is accordingly able to generate an achromatic left parallax image and an achromatic right parallax image based on the G signals of the pixel groups corresponding to the first pixel group and the second pixel group. In the following, for convenience of explanation, the above "achromatic left parallax image" is referred to as the "left eye image", and the above "achromatic right parallax image" is referred to above the "right eye image".

The split-image processor 32 synthesizes the left eye image based on the first image output from the first pixel group together with the right eye image based on the second image output from the second pixel group and generates a split-image. Image data of the generated split-image is output to the display controller 36.

The display controller 36 generates image data for display based on the image data for display corresponding to the third pixel group input from the normal processor 30, and image data of the split-image corresponding to the first and second pixel groups input from the split-image processor 32. For example, the display controller 36 synthesizes a split-image represented by image data input from the split-image processor 32 in a display region of a normal image represented by image data corresponding to the third pixel group input from the normal processor 30. The image data obtained by synthesizing is then output to display devices. Namely, the display controller 36A outputs the image data to the display section 213, and the display controller 36B outputs the image data to the LCD 247, such that normal images are consecutively displayed as video images, and split images are consecutively displayed as video images in the display region of the normal images, on the display devices.

Explanation has been given in the first exemplary embodiment of an example in which the split-image is synthesized within a display region of the normal image, however there is no limitation thereto. During live-view display, the display controller 36 may synchronize the normal image and the split-image so as to be displayed overlapping on the display device. In such cases too, the display controller 36 displays on the display devices the normal image continuously as a video image, and the split-image continuously as a video image.

Figure 11A:
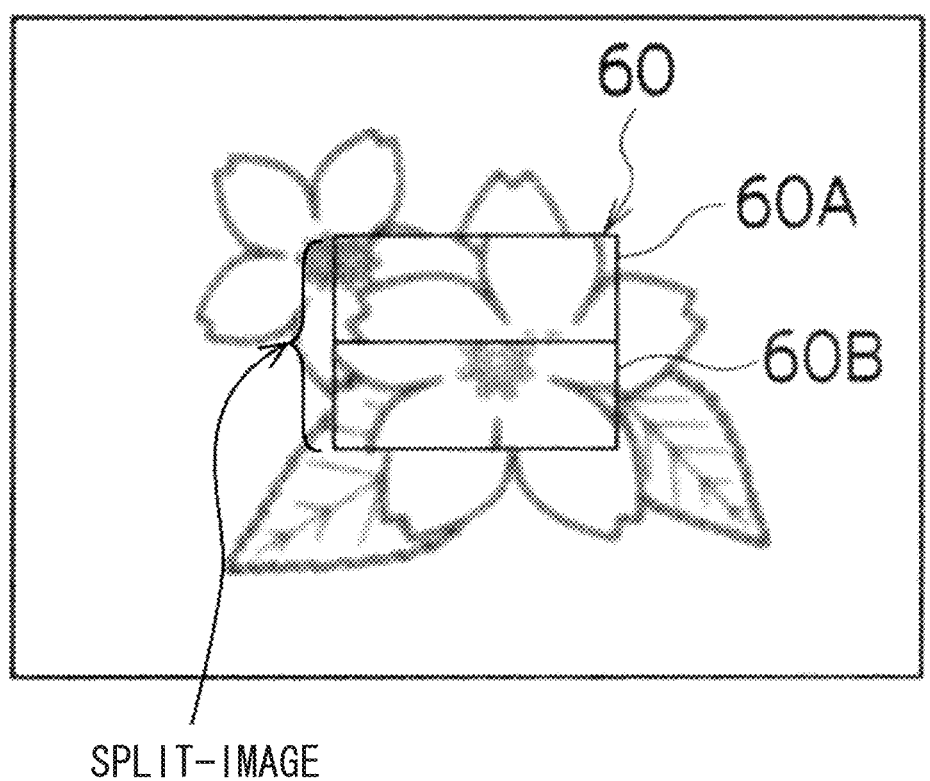
FIG. 11A is a screen view illustrating an example of a live-view image displayed on a display section of an imaging device according to the first to the third exemplary embodiment, for a live-view image in an unfocused state.
Figure 11B:
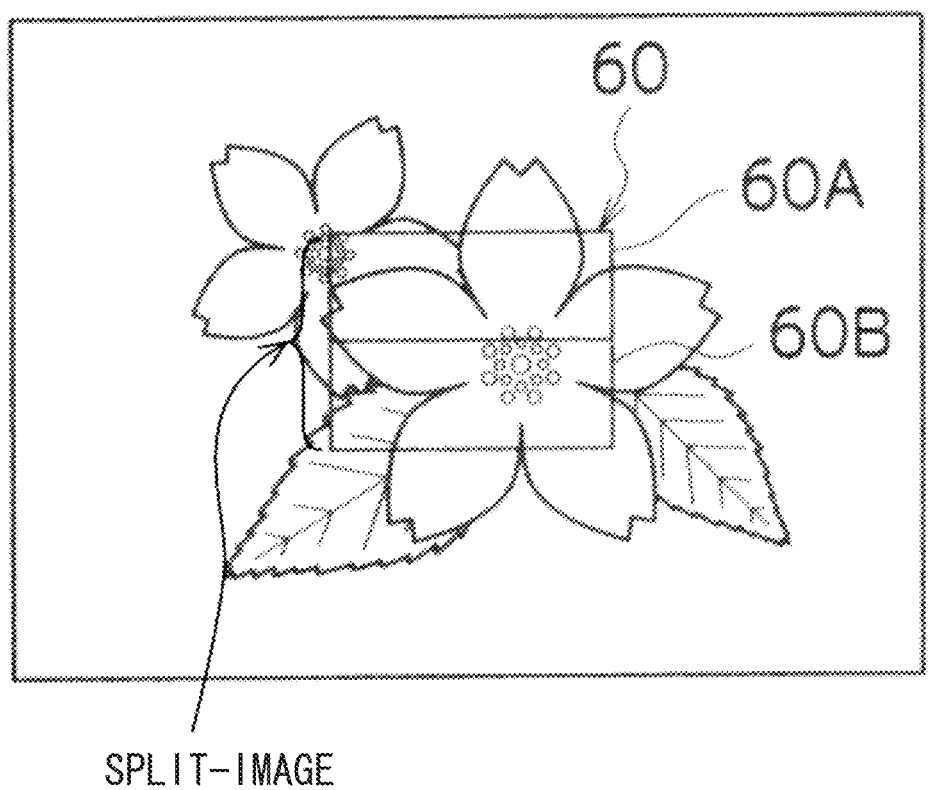
FIG. 11B is a screen view illustrating an example of a live-view image displayed on a display section of an imaging device according to the first to the third exemplary embodiment, for a live-view image in a focused state.

The split-image generated by the split-image processor 32 is a multi-section image synthesized from one section of a left eye image, and one section of a right eye image. Examples of what is referred to here as a "multi-section image" are the split-images illustrated in FIG. 11A and FIG. 11B. The split-images illustrated in FIG. 11 are split-images of images synthesized from the top half image from the left eye image, and from the bottom half image from the right eye image, and are images in which the 2 sections of the images divided in 2 in the up-down direction are displaced with respect to each other in a specific direction (for example the parallax generation direction) according to the state of focus. The mode of the split-image is not limited to those of the examples in FIG. 11A, and FIG. 11B, and may be an image synthesized from one section of the left eye image and one section of the right eye image at a position corresponding to the position of a specific region of the display section 213. In such cases, for example, 4 sections of image divided in 4 in the up-down direction may be displaced with respect to each other in a specific direction (for example the parallax generation direction) according to the state of focus.

The method for synthesizing the split-image onto the normal image is also not limited to the synthesis method in which the split-image is fitted in place of an image of a portion of a normal image. For example, a synthesis method may be employed in which the split-image is superimposed on the normal image. Moreover, when superimposing the split-image, a synthesis method may be employed in which transparencies, of the image of a portion of a normal image onto which the split-image is to be superimposed and of the split-image, are appropriately adjusted for superimposition. In this manner the live-view image illustrating the subject-image that is successively captured is displayed on the screen of the display device, and the displayed live-view image is an image in which the split-image is displayed within a display region of the normal image.

The HYBRID FINDER 220 includes an OVF 240 and an EVF 248. The OVF 240 is a reverse Galileo finder including an object lens 244 and an eyepiece lens 246, and the EVF 248 includes the LCD 247, a prism 245, and the eyepiece lens 246.

A liquid crystal shutter 243 is overlaid at the front of the object lens 244, and the liquid crystal shutter 243 blocks light such that the optical image is not incident to the object lens 244 while the EVF 248 is being used.

The prism 245 reflects the electronic image or various data displayed on the LCD 247 and guides these toward the eyepiece lens 246, and synthesizes an optical image together with information (electronic image, various types of data) displayed on the LCD 247.

When the finder switching lever 214 is turned in the arrow SW direction illustrated in FIG. 1, switching is made at each turn between the OVF mode that enables a visual check to be made on an optical image using the OVF 240, and the EVF mode that enables a visual check to be made on the electronic image using the EVF 248.

In the OVF mode, the display controller 36B controls so that the liquid crystal shutter 243 is in a non-light blocking state, enabling a visual check to be made on an optical image through the eyepiece section. Moreover, only the split-image is displayed on the LCD 247. This thereby enables a finder image to be displayed in which the split-image is superimposed on a portion of the optical image.

In the EVF mode, the display controller 36B controls so that the liquid crystal shutter 243 is in a light blocking state, enabling a visual check to be made through the eyepiece section of an electronic image displayed alone on the LCD 247. Similar image data to the image data synthesized with the split-image for output on the display section 213 is input to the LCD 247. This enables the electronic image synthesized with the split-image to be displayed on a portion of the normal image, similarly to with the display section 213.

Figure 12:
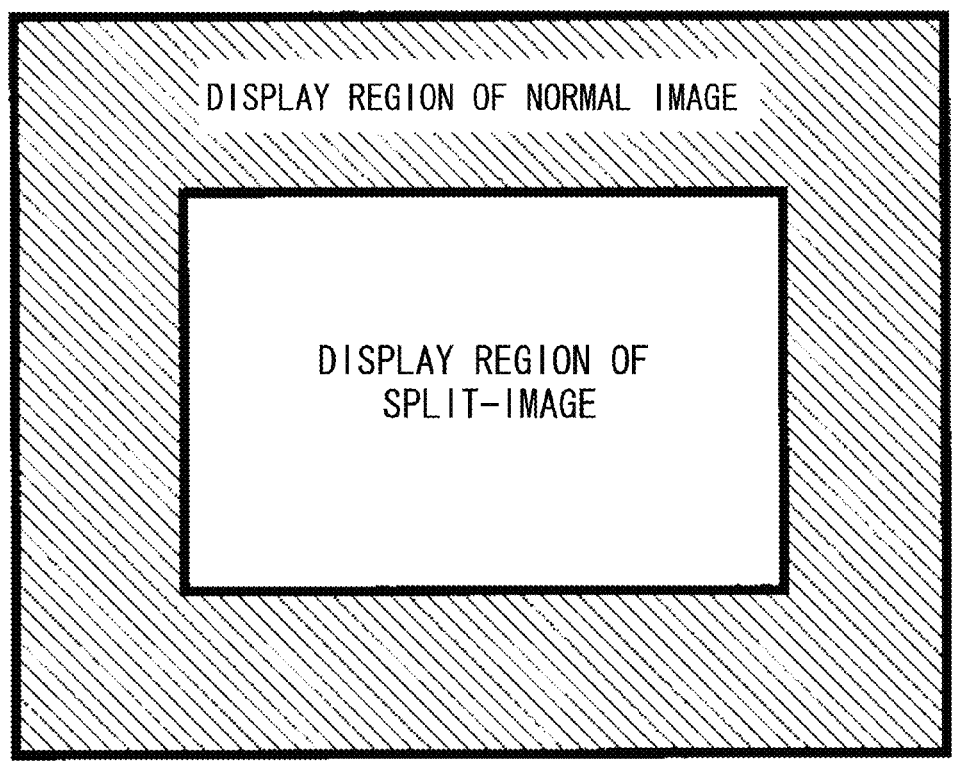
FIG. 12 is a schematic diagram illustrating an example of positions of a split-image display region and a normal image display region in a display device included in an imaging device according to the first to the third exemplary embodiment.

As illustrated in the example in FIG. 12, the split-image is displayed within a rectangular frame at a central portion of the screen of the display device, and the normal image is displayed in a peripheral region outside the split-image. The edge line representing the rectangular frame illustrated in FIG. 12 is not actually displayed, however it is illustrated in FIG. 12 for ease of explanation.

Figure 13:
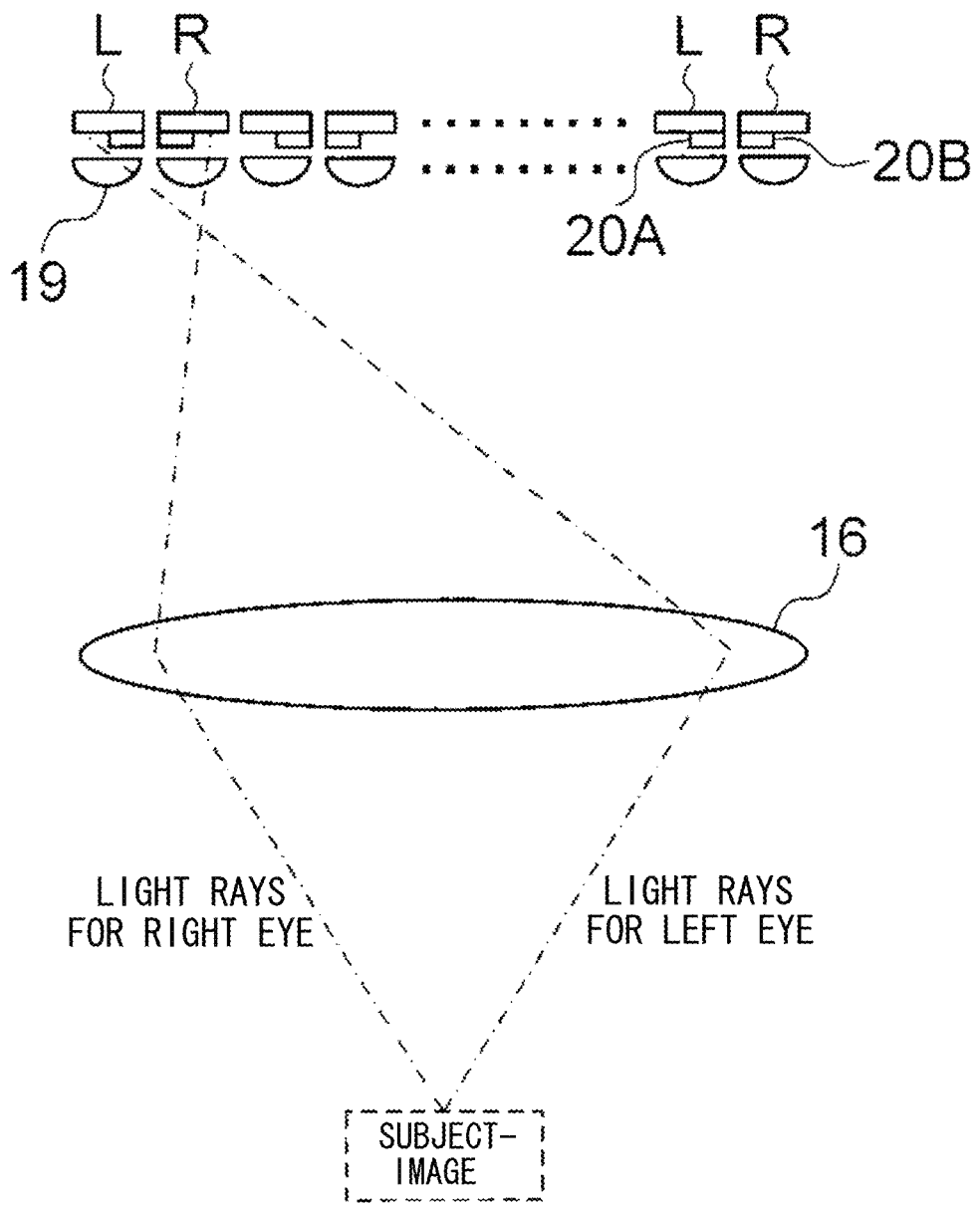
FIG. 13 is a schematic diagram illustrating an example of paths of rays of light incident to respective first and second pixels included in an imaging device according to the first to the third exemplary embodiment.
Figure 14:
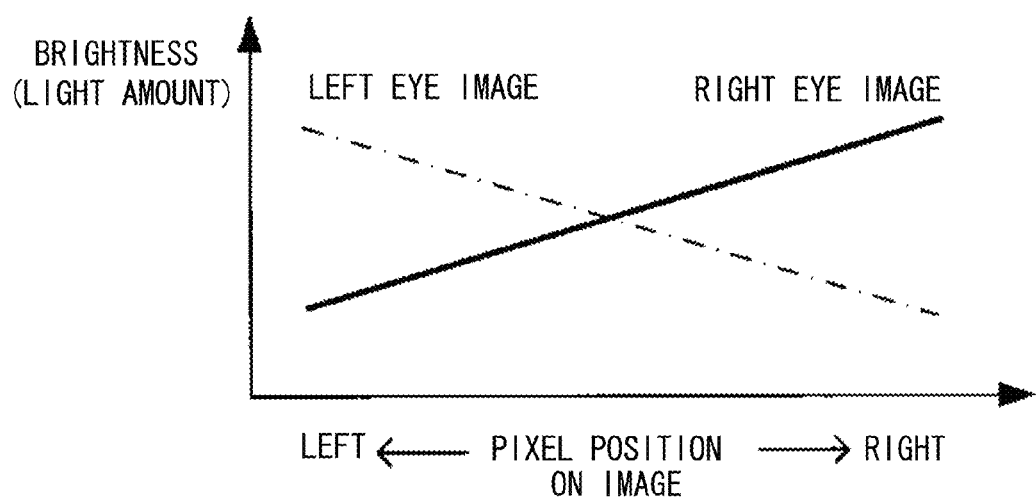
FIG. 14 is a graph illustrating an example of the influence of linear light reduction characteristics in a pupil division direction, imparted to the brightness of respective pixels in a direction corresponding to a pupil division direction for each of the left eye image and the right eye image.

As illustrated in the example in FIG. 13, in the imaging device 100, light rays for the left eye that have passed through the imaging lenses 16 during imaging a subject (light rays that contribute to generating the left eye image), pass through the microlenses 19 corresponding to first pixels L and are incident to the first pixels L. However, the light rays for the left eye that pass through the microlens 19 corresponding to the second pixels R, are blocked by the light-blocking members 20B, and so are not incident to the second pixels R. Light rays for the right eye that have passed through the imaging lenses 16 (light rays that contribute to generating the right eye image), pass through the microlenses 19 corresponding to the second pixels R and are incident to the second pixels R. However, the light rays for the right eye that pass through the microlenses 19 corresponding to the first pixels L are blocked by the light-blocking members 20A, and so are not incident to the first pixels L. Thus by placing the light-blocking members over half portions of the pixels, the respective centers of the light rays for the left eye and the light rays for the right eye are displaced from the optical path of the imaging lenses 16, and the light reduction characteristics for each of the first pixel group and the second pixel group change linearly according to pixel position in the pupil division direction. The change in light reduction characteristics appears as a change in brightness in the left eye image and the right eye image. Namely, in a case in which light is incident to the imaging lenses 16 at a uniform amount from straight in front, the brightness in the left-right direction (the direction corresponding to the pupil division direction) of the obtained left eye image and right eye image changes linearly according to pixel position. For example, as illustrated in FIG. 14, in the left eye image, the brightness is less the further the pixel position is toward the right, and in the right eye image, the brightness is less the further the pixel position is toward the left. The linear change in opposite directions, to the left or to the right, in the brightness of the left eye image and the right eye image also affects the image quality of the split-image.

Figure 15:
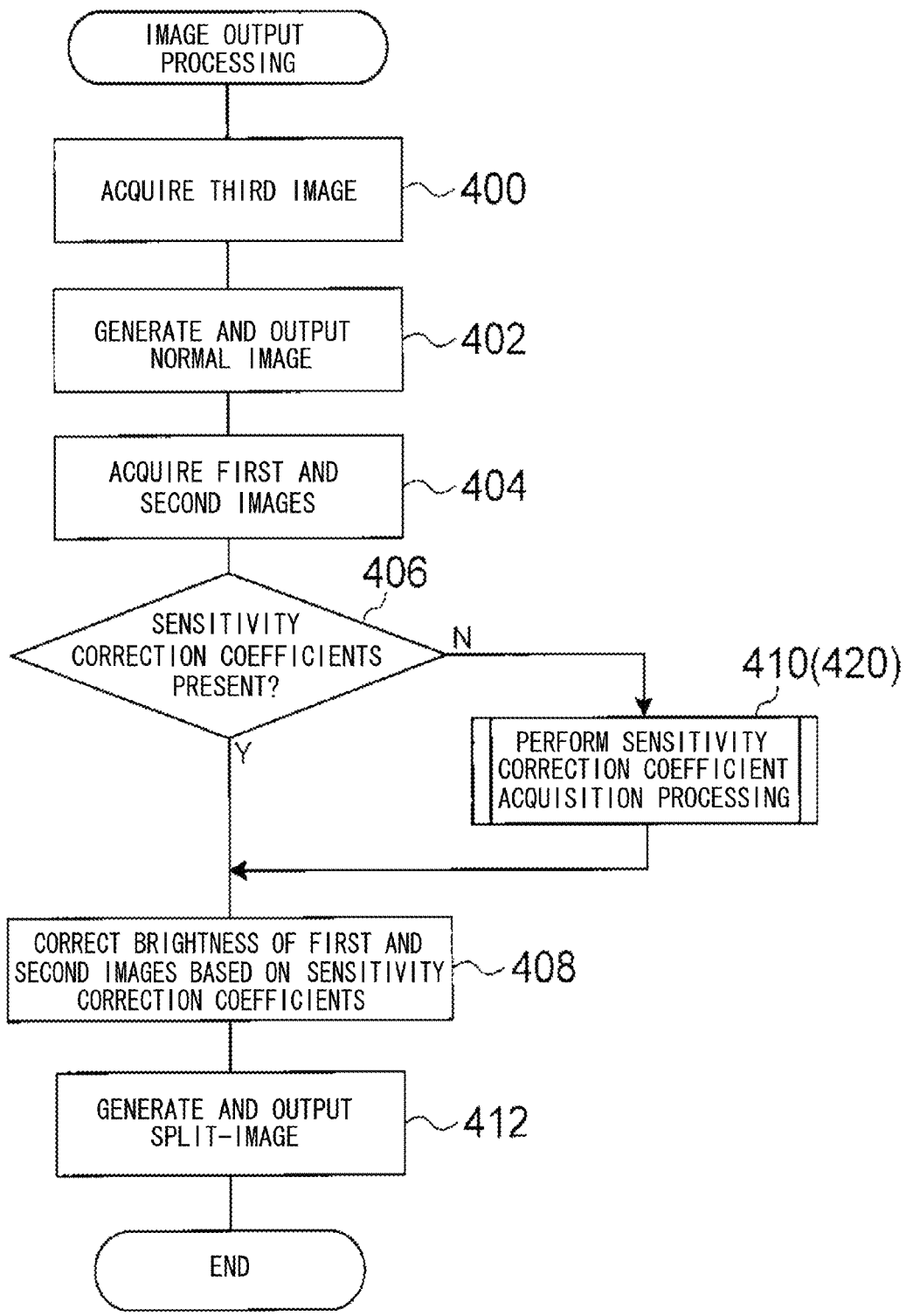
FIG. 15 is a flow chart illustrating an example of a flow of image output processing according to a first exemplary embodiment.

In the imaging device 100 according to the first exemplary embodiment, the image processor 28 performs image output processing of the example illustrated in FIG. 15. Explanation next follows regarding the image output processing performed by the image processor 28, with reference to FIG. 15. In the following an example is given of a case in which the image processor 28 performs the image output processing, however the present invention is not limited thereto, and, for example, the CPU 12 may perform the image output processing in the imaging device 100 by executing an image output processing program.

In FIG. 15, at step 400, the third image is acquired by the image acquisition section 28A, and processing then transitions to step 402. At step 402, a normal image is generated by the generation section 28D based on the third image acquired at step 400, and the generated normal image is output to a specific storage region (for example the memory 26) and to the display controller 36.

Then at step 404, after the first and second images have been acquired by the image acquisition section 28A, processing transitions to step 406.

At step 406, determination is made by the correction section 28C as to whether or not there are sensitivity correction coefficients stored in the memory 26 for each of the first image and the second image. Affirmative determination is made at step 406 when there are sensitivity correction coefficients stored in the memory 26 for each of the first image and the second image, and processing transitions to step 408. Negative determination is made at step 406 when there are no sensitivity correction coefficients stored in the memory 26 for each of the first image and the second image, and processing transitions to step 410.

Figure 16:
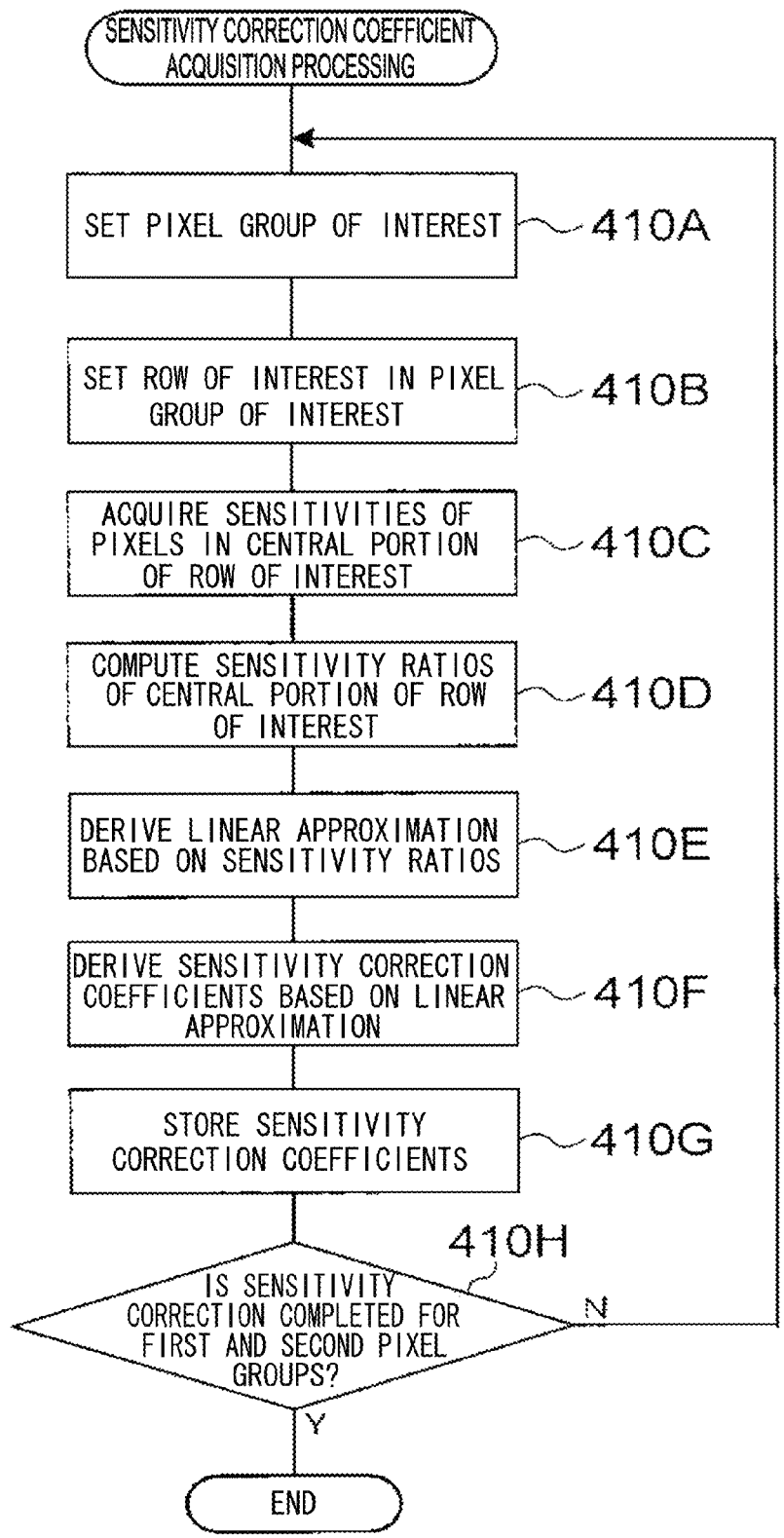
FIG. 16 is a flowchart illustrating an example of a flow of sensitivity correction coefficient acquisition processing according to the first exemplary embodiment.

At step 410, the sensitivity correction coefficient acquisition processing 410 illustrated as an example in FIG. 16 is performed by the image processor 28, and then processing transitions to step 408.

In the sensitivity correction coefficient acquisition processing illustrated in FIG. 16, first at step 410A, a pixel group for which sensitivity of pixels is to be acquired (pixel group of interest) is set in the first and second pixel groups by the sensitivity acquisition section 28B. Then processing transitions to step 410B. The pixel group of interest corresponds to a pixel group in the first and second pixel groups that has not yet been the subject of the processing of steps 410B to 410G, described below.

At step 410B, a row of interest (for example 1 row passing through the center point of the pixel group of interest) is set by the sensitivity acquisition section 28B in the pixel group of interest that was set at step 410A. Processing then transitions to step 410C.

At step 410C, the sensitivities are acquired by the sensitivity acquisition section 28B for plural pixels included in a central portion of the row of interest set at step 410B. Processing then transitions to step 410D.

At step 410D, a sensitivity ratio is computed by the correction section 28C for each of the pixels included in the central portion of the row of interest based on the sensitivities acquired at step 410C. Processing then transitions to step 410E. Reference here to "sensitivity ratio" indicates a proportion of actual measured sensitivity (the sensitivity acquired at step 410C) with respect to a target sensitivity. In the present exemplary embodiment, "1.0" is employed as an example of the target sensitivity.

At step 410E, linear approximations are derived by the correction section 28C for the sensitivities of the plural pixels included in the central portion of the row of interest based on the sensitivity ratios computed at step 410D. Processing then transitions to step 410F.

Figure 17:
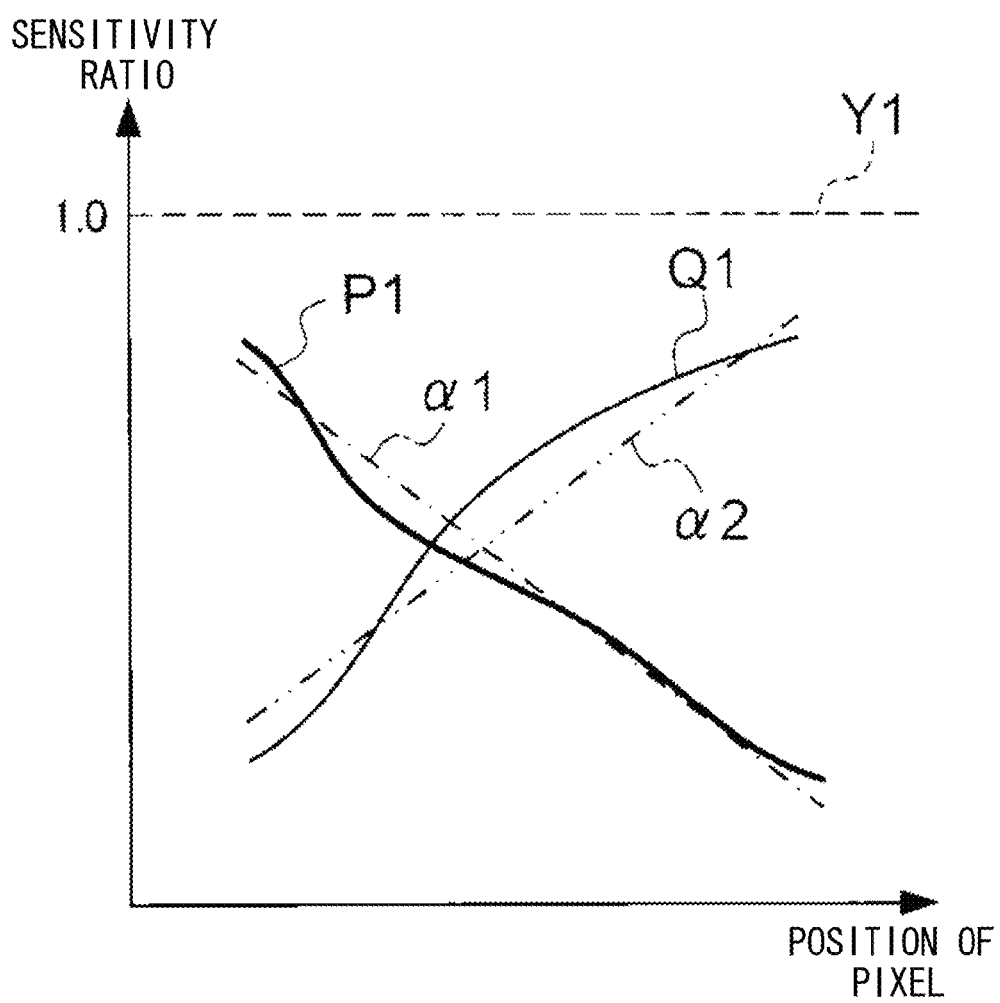
FIG. 17 is a graph illustrating an example of a first sensitivity ratio curve, a second sensitivity ratio curve, a first linear approximation, a second linear approximation, and a target sensitivity ratio employed in sensitivity correction coefficient acquisition processing according to the first exemplary embodiment.

When the processing of step 410E has been performed by the correction section 28C, as illustrated in the example in FIG. 17, a first linear approximation α1 shown by the single dot intermittent line is derived for a first sensitivity ratio curve P1 (the curve shown by the bold line). Moreover, as illustrated in the example in FIG. 17, a second linear approximation α2 shown by the double dot intermittent line is derived for a second sensitivity ratio curve Q1 (the curve shown by the thin line).

The first sensitivity ratio curve P1 represents a distribution of sensitivity ratios for each of the pixels contained in the row of interest for the first pixel group. The second sensitivity ratio curve Q1 represents a distribution of sensitivity ratios for each of the pixels contained in the row of interest in the second pixel group. The first linear approximation α1 is a linear approximation of sensitivity ratios related to each of the pixels included in the central portion of the row of interest computed for the first pixel group at step 410D. The second linear approximation α2 is a linear approximation of sensitivity ratios related to each of the pixels included in the central portion of the row of interest computed for the second pixel group at step 410D.

In the present invention, a target sensitivity ratio Y1 illustrated in FIG. 17 is set as an example of a sensitivity ratio to employ as the target during correction of the sensitivity ratios of each of the pixels of the first pixel group. In the present exemplary embodiment, "1.0" is employed as an example of the target sensitivity ratio Y1.

At step 410F, sensitivity correction coefficients are derived by the correction section 28C based on the linear approximations derived at step 410E, then processing transitions to step 410G. The sensitivity correction coefficients here denote sensitivity correction coefficients employed to correct the brightness output from each of the pixels by correcting the sensitivity of each of the pixels in the pixel group of interest.

Explanation follows regarding an example of a derivation procedure for the sensitivity correction coefficients. The correction section 28C adjusts the linear approximation derived at step 410E to a straight line (referred to below as the "correction straight line") having a minimum sum of squares for distance to the target sensitivity ratio Y1, and takes the dependent variable of the correction straight line obtained by such adjustment as the sensitivity correction coefficient. The correction straight line is a first order function, with the slope and intercept of the first order function equivalent to the slope and intercept of the linear approximation (first order function) after adjustment represented by following Equation (1) derived at step 410E. Namely, as the slope and intercept of the correction straight line, a slope a and an intercept b are employed that give the minimum sum of squares S (for example as represented by following Equation (2)) for the distance between the dependent variable Z of the linear approximation represented by Equation (1) and the target sensitivity ratio Y1. The slope a and the intercept b that give the minimum sum of squares S denote, for example, the slope a and the intercept b represented by following Equation (4) obtained by solving the following Equation (3). In Equation (2), K is the value of target sensitivity ratio Y1, and in Equations (1) to (3), Xi represents a coordinate value of a position of a pixel in the pupil division direction, wherein i represents an integer in a range from 0 to n−1.

$$Z = aXi + b \tag{1}$$

$$S = \Sigma_{i=0}^{n-1} \{K - (aX_i + b)\}^2 \tag{2}$$

$$\frac{\partial S}{\partial a} = \frac{\partial S}{\partial b} = 0 \tag{3}$$

$$\binom{a}{b} = \frac{1}{\Sigma_{i=0}^{n-1} i^2 Z_i^2 \Sigma_{i=0}^{n-1} Z_i^2 - (\Sigma_{i=0}^{n-1} iZ_i^2)} \times \binom{\Sigma_{i=0}^{n-1} Z_i^2 \;\; -\Sigma_{i=0}^{n-1} iZ_i^2}{-\Sigma_{i=0}^{n-1} iZ_i^2 \Sigma_{i=0}^{n-1} i^2 Z_i^2} \binom{\Sigma_{i=0}^{n-1} iZ_i}{\Sigma_{i=0}^{n-1} Z_i} \tag{4}$$

The correction straight line is a first order function obtained by plugging slope a and the intercept b represented by Equation (4) into Equation (1), and the dependent variable of the correction straight line is employed as the sensitivity correction coefficient. Namely, the dependent variable of the correction straight line for each of the pixel positions (Xi) is derived as the sensitivity correction coefficient.

At step 410G, the sensitivity correction coefficients derived at step 410F for the pixel group of interest are stored by the correction section 28C in the memory 26 for each of the pixels included in the row of interest, then processing transitions to step 410H.

At step 410H, determination is made by the correction section 28C as to whether or not the processing of steps 410A to 410G has been performed for each of the first and second pixel groups. Negative determination is made at step 410H when the processing of steps 410A to 410G has not been performed for each of the first and second pixel groups, and processing transitions to step 410A. Affirmative determination is made at step 410H when the processing of steps 410A to 410G has been performed for each of the first and second pixel groups, and the sensitivity correction coefficient acquisition processing is ended.

Returning to FIG. 15, at step 408, the brightness of the first and second images acquired at step 404 is corrected by the correction section 28C based on the sensitivity correction coefficients stored in the memory 26 for the row of interest in each of the first and second pixel groups. Namely, the correction section 28C corrects the brightness of the first image by multiplying the sensitivity of the pixels corresponding to each of the rows of the first pixel group by the sensitivity correction coefficient for each of the pixels included in the row of interest in the first pixel group. The correction section 28C corrects the brightness of the second image by multiplying the sensitivity of the pixel corresponding to each of the rows of the second pixel group by the sensitivity correction coefficient for each of the pixels included in the row of interest in the second pixel group.

Figure 18:
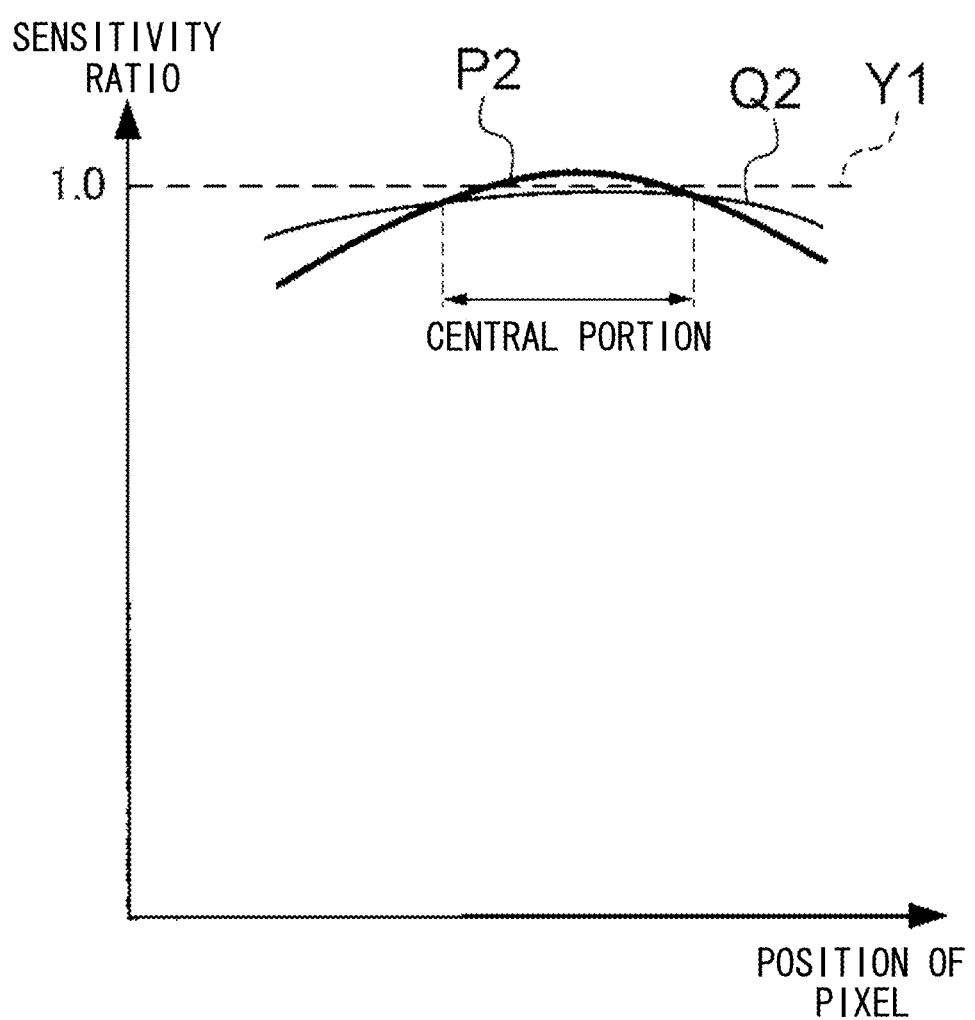
FIG. 18 is a graph illustrating an example of sensitivity ratios of pixels in a pupil division direction corrected using sensitivity correction coefficients obtained by performing sensitivity correction coefficient acquisition processing according to the first exemplary embodiment.

When the processing of step 408 has been performed by the correction section 28C, the sensitivity ratios of each of the pixels in the first pixel group are corrected in row units, and the first sensitivity ratio curve P1 illustrated in FIG. 17 is corrected to a first sensitivity ratio curve P2 (the bold curve) such as the example illustrated in FIG. 18. A comparison of the first sensitivity ratio curve P1 illustrated in FIG. 17 and the first sensitivity ratio curve P2 illustrated in FIG. 18 shows that the first sensitivity ratio curve P2 illustrated in FIG. 18 is a better approximation to the target sensitivity ratio Y1 than the first sensitivity ratio curve P1 illustrated in FIG. 17.

When the processing of step 408 has been performed by the correction section 28C, the sensitivity ratios of each of the pixels in the second pixel group are corrected in row units, and the second sensitivity ratio curve Q1 illustrated in FIG. 17 is corrected to a second sensitivity ratio curve Q2 (the thin line curve) such as the example illustrated in FIG. 18. A comparison of the second sensitivity ratio curve Q1 illustrated in FIG. 17 and the second sensitivity ratio curve Q2 illustrated in FIG. 18 shows that the second sensitivity ratio curve Q2 illustrated in FIG. 18 is a better approximation to the target sensitivity ratio Y1 than the second sensitivity ratio curve Q1 illustrated in FIG. 17.

Moreover, the difference in sensitivity ratios between corresponding pixels included in the center portion of each of the first sensitivity ratio curve P2 and the second sensitivity ratio curve Q2 is smaller than the difference in sensitivity ratios between corresponding pixels included in both end portions.

Moreover, at step 408, the brightness of the first and second images is adjusted by the correction section 28C, by further multiplying the brightness of all the pixels included in each of the first and second images obtained by performing brightness correction based on the sensitivity correction coefficients by a specific coefficient (by performing digital gain adjustment).

At the next step 412, a left eye image and a right eye image are generated by the generation section 28D based on the first and second images corrected at step 402, a split-image is generated based on the generated left eye image and right eye image, and the split-image is output to the display controller 36. When the display controller 36 has been input with the normal image output at step 402, and the split-image output at step 412, the display controller 36 controls to display on the display devices the normal images consecutively as a video image, and to display the split-images consecutively as a video image within the display region of the normal image.

Thus when the steps 402, 412 have been performed by the generation section 28D, live view images are displayed on the display section 213 and the HYBRID FINDER 220 as illustrated in the examples in FIG. 11A and FIG. 11B. In the examples in FIG. 11A and FIG. 11B, the split-image is displayed in the region inside a frame 60, corresponding to the split-image display region illustrated as an example in FIG. 12, and the normal image is displayed in the region outside the frame 60, corresponding to the normal image display region.

Namely, the first and second pixel groups are provided so as to correspond to the size of the frame 60. The split-image is broadly divided into an image (parallax image) of an upper half 60A of the frame 60 of a left eye image corresponding to the first image output from the first pixel group, and an image (parallax image) of a lower half 60B of the frame 60 of a right eye image corresponding to the second image output from the second pixel group.

In cases in which the subject-image corresponding to the image in the frame 60 is not in focus in the imaging lenses 16, the image is displaced in the parallax generation direction (for example the row direction) at a boundary in the split-image between the parallax image of the upper half 60A and the parallax image of the lower half 60B, as illustrated in FIG. 11A. The image is also displaced in the parallax generation direction at the boundary between the normal image and the split-image. This shows that phase difference is occurring, and a photographer is able to visually discern that phase difference has occurred, and through using the split-image is able to visually discern the parallax generation direction.

However, in cases in which the subject-image corresponding to the image in the frame 60 is in focus in the imaging lenses 16, the image is aligned at the boundary between the parallax image of the upper half 60A and the parallax image of the lower half 60B in the split-image, as illustrated in FIG. 11B. The image is also aligned at the boundary between the normal image and the split-image. This shows that phase difference has not occurred, and through using the split-image a photographer is able to visually discern that phase difference has not occurred.

Thus the photographer is able to check the state of focus of the imaging lenses 16 using the split-image displayed on the display device. Moreover, in manual focus mode, the focus misalignment amount (defocus amount) can be made zero by manual operation of the focus ring 301.

A linear trend appearing in the light reduction characteristics in the pupil division direction for each of the first and second pixel groups is diminished by the correction section 28C correcting the sensitivity of the pixels. When the sensitivity of the pixels are corrected by the correction section 28C, as illustrated in the example in FIG. 19, linear change in brightness of the right eye image and the left eye image caused by the linear change in sensitivity of the pixels in the first and second pixel groups along the pupil division direction is diminished compared to cases in which the sensitivity of the pixels is not corrected.

As explained above, in the imaging device 100 according to the first exemplary embodiment, the sensitivities of the pixels in the pupil division direction are acquired by the sensitivity acquisition section 28B for each of the first and second pixel groups. Then the linear approximated sensitivity correction coefficients are derived by the correction section 28C for each of the first and second images based on the sensitivities acquired by the sensitivity acquisition section 28B, and the brightness of the first and second images are corrected based on the derived sensitivity correction coefficients. Thus the imaging device 100 according to the first exemplary embodiment is able to secure better real-timeliness of display of the split-images, by using a simple configuration, than in cases lacking the present configuration.

In the imaging device 100 according to the first exemplary embodiment, as the sensitivity correction coefficients, sensitivity correction coefficients are employed such that the sensitivity difference between corresponding pixels included in a center portion in the pupil division direction of each of the first and second pixel groups is smaller than the sensitivity difference between corresponding pixels included in both end portions in the pupil division direction of each of the first and second pixel groups. Thus the imaging device 100 according to the first exemplary embodiment is, with a simple configuration, able to make the sensitivity difference between pixels included in the central portion in a direction corresponding to the pupil division direction in the split-image less than the sensitivity difference at both end portions.

Moreover, in the imaging device 100 according to the first exemplary embodiment, the sensitivities of plural pixels included in the central portion of the row of interest are acquired by the sensitivity acquisition section 28B, and the sensitivity correction coefficient is derived by the correction section 28C based on the acquired sensitivities. Thus the imaging device 100 according to the first exemplary embodiment is able to correct the brightness of the central portion of the split-image with higher precision than cases in which the sensitivity of the pixels included in the central portion of the row of interest are not acquired.

Explanation has been given in the first exemplary embodiment of a case in which the sensitivity acquisition section 28B acquires the sensitivities of pixels included in the central portion of the row of interest, and the correction section 28C derives the linear approximation based on the sensitivity ratios related to the acquired sensitivities, however the present invention is not limited thereto. For example, in addition to the sensitivities of the pixels included in the central portion of the row of interest, the sensitivity acquisition section 28B may acquire the sensitivities of the pixels included in both end portions of the row of interest, and the correction section 28C may derive a linear approximation based on the sensitivity ratios related to the acquired pixel sensitivities. However in such cases, the pixels that are the target for sensitivity acquisition from out of the pixels included in both end portions of the row of interest are pixels of number and position such that the sensitivity ratio difference after correction at the central portion of the row of interest is less than the sensitivity ratio difference after correction at both end portions of the row of interest. Note that the number and position of the pixels that are the sensitivity acquisition target are, for example, determined based on results obtained by testing, simulation, or the like to identify the number and position such that the sensitivity ratio difference after correction at the central portion of the row of interest is less than the sensitivity ratio difference at both end portions of the row of interest.

Moreover, in the first exemplary embodiment, the sensitivity correction coefficients are derived based on the sensitivities of each of the pixels included in a specific single row under the assumption that the light reduction characteristics are the same as each other for all the rows of the first and second pixel groups, and the derived sensitivity correction coefficients are employed to correct the sensitivities of the pixels in each of the rows, however the present invention is not limited thereto. For example, the sensitivity correction coefficient may be derived for each of the pixels included in each of all the rows in the first and second pixel groups, and the derived sensitivity correction coefficients employed to correct the sensitivities of the pixels corresponding to the pixels included in each respective corresponding row. Moreover, for example, the sensitivity correction coefficients may be derived for each of the pixels included in each row of a specific number of rows in each of the first and second pixel groups, and the derived sensitivity correction coefficients employed to correct the sensitivities of the pixels corresponding to the pixels included in each respective corresponding row and nearby row.

In the first exemplary embodiment, explanation has been given of cases in which sensitivity correction coefficient acquisition processing is performed when the sensitivity correction coefficients are not stored in the memory 26, however the present invention is not limited thereto. For example, the sensitivity correction coefficients may be updated by performing the sensitivity correction coefficient acquisition processing illustrated in FIG. 16 in cases in which specific conditions are satisfied. Examples of the specific conditions include, for example, when an instruction to update the sensitivity correction coefficient has been input through the operation section 14. Another example thereof is a condition that a predetermined time has arrived as a time to perform maintenance on the imaging device 100.

Second Exemplary Embodiment

Explanation has been given in the first exemplary embodiment of cases in which the correction section 28C corrects the brightness of images based on the sensitivity correction coefficient derived while ignoring the aperture number of the imaging device 100. Explanation follows in the second exemplary embodiment regarding a case in which the brightness of images is corrected based on sensitivity correction coefficients derived according to the aperture number. In the second exemplary embodiment, the same reference numerals are allocated to configuration elements explained in the first exemplary embodiment, and explanation will be omitted thereof An imaging device 100A according to the second exemplary embodiment illustrated in FIG. 1 differs from the imaging device 100 according to the first exemplary embodiment in the point that a step 420 is provided in place of the step 410 in the image output processing, as illustrated in the example of FIG. 15. The imaging device 100A differs from the imaging device 100 according to the first exemplary embodiment in the point that a unique reference sensitivity is associated with each of predetermined plural aperture numbers (F numbers in the example here). Different reference sensitivities are associated with each of the plural aperture numbers in order to derive the sensitivity correction coefficients according to the different tendencies for a change in sensitivity according to the aperture number.

In cases in which, for example, the plural predetermined aperture numbers are F2.0 and F5.6, as illustrated in the example of FIG. 21 and FIG. 22, the slopes of the first linear approximation $\alpha 1$ and the second linear approximation $\alpha 2$ at F2.0 differ from the slopes of the first linear approximation $\alpha 1$ and the second linear approximation $\alpha 2$ at F5.6. Namely, the slope of the first linear approximation $\alpha 1$ and the second linear approximation $\alpha 2$ at F5.6 is steeper (has a larger absolute value of slope) than the slope of the first linear approximation $\alpha 1$ and the second linear approximation $\alpha 2$ at F2.0. Thus the slope of the sensitivity ratios after correction of the pixels in the pupil division direction for each of the first and second pixel groups also differ from each other. In the example illustrated in FIG. 21 and FIG. 22, the sensitivity ratios after correction of the pixels in the pupil division direction for each of the first and second pixel groups at F5.6 have a greater divergence from the target sensitivity ratio Y1 at the pixel positions included in both end portions in the pupil division direction than at F2.0. Reference here to "greater divergence" means that there is a greater degree of protrusion (greater bulge) above the target sensitivity ratio Y1.

Thus as an example in the second exemplary embodiment, a larger value is employed as the value of target sensitivity used in computing the sensitivity ratios at F5.6 than the target sensitivity employed to compute the sensitivity ratio at F2.0. The value of target sensitivity ratio Y1 at F5.6 is accordingly smaller than the value of target sensitivity ratio Y1 at F2.0. In the second exemplary embodiment, since 1.186 is employed as the target sensitivity, a value of 0.843 (=1.0/1.186) is employed as an example of the target sensitivity ratio Y1 at F5.6.

Figure 20:
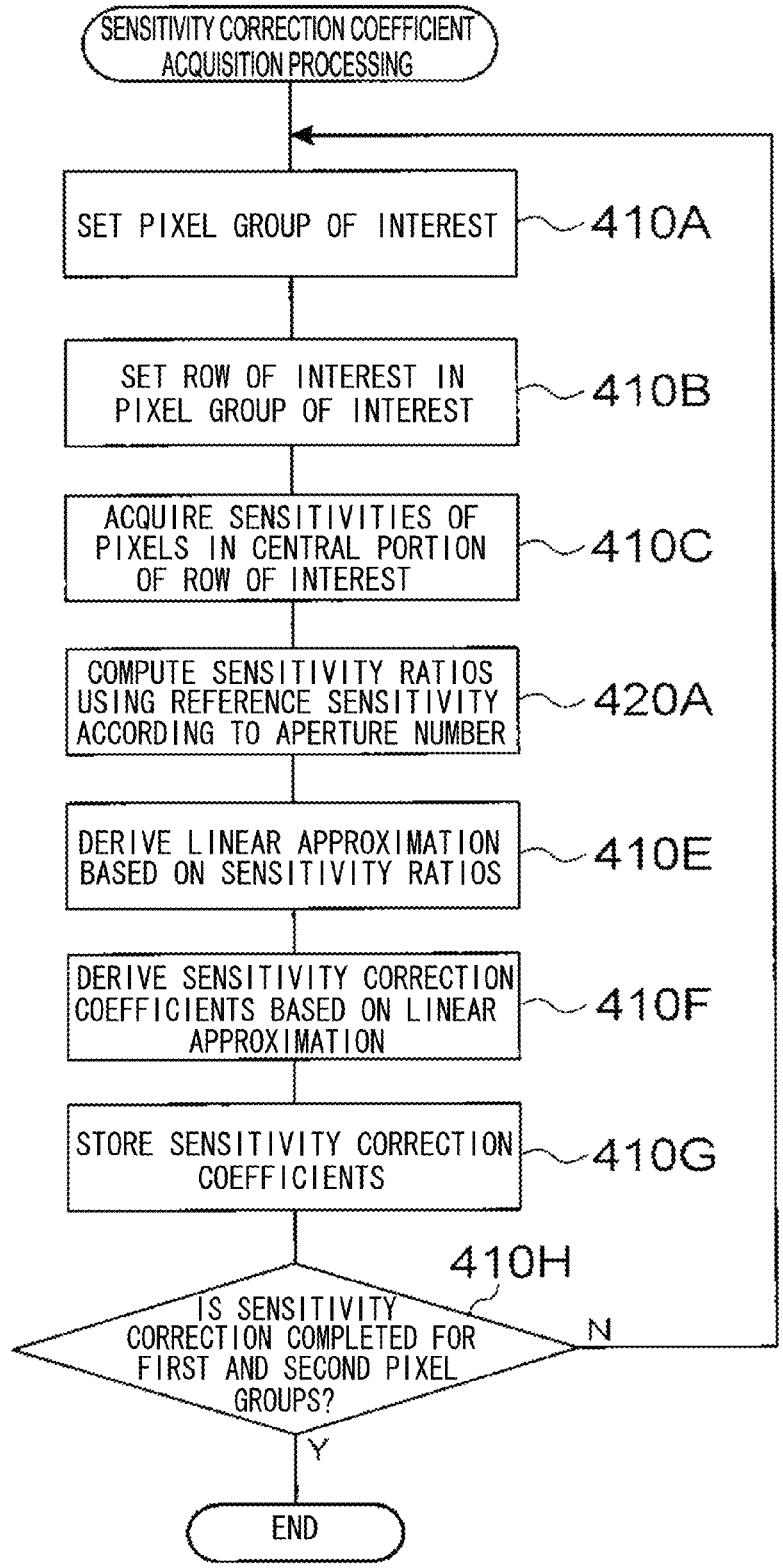
FIG. 20 is a flowchart illustrating an example of a flow of sensitivity correction coefficient acquisition processing according to the second exemplary embodiment.

In the image output processing illustrated in FIG. 15, the sensitivity correction coefficient acquisition processing illustrated in FIG. 20 is performed as an example by the image processor 28 at step 420, and then processing transitions to step 408.

The sensitivity correction coefficient acquisition processing illustrated in FIG. 20 differs from the sensitivity correction coefficient acquisition processing illustrated in FIG. 16 and explained in the first exemplary embodiment in the point that the step 420A is provided in place of step 410D.

At step 420A in the sensitivity correction coefficient acquisition processing illustrated in FIG. 20, the target sensitivity (the reference sensitivity) according to the aperture number currently set from out of the plural predetermined aperture numbers is employed by the correction section 28C to compute the sensitivity ratios related to each pixel included in the central portion of the row of interest. For example, when the currently set aperture number is F5.6, 1.186 is employed as the target sensitivity to compute the sensitivity ratio.

The sensitivity correction coefficients are derived based on the thus computed sensitivity ratios, the sensitivity ratios for each of the pixels included in the row of interest are corrected based on the derived sensitivity correction coefficients, and, as illustrated in the example in FIG. 23, divergence from the target sensitivity ratio Y1 is suppressed for the sensitivity ratios of each of the pixels included in both end portions.

Thus in the imaging device 100A according to the second exemplary embodiment, divergence caused by the aperture number to the brightness of pixels included in both end portions in the direction corresponding to the pupil division direction of the split-image can be better suppressed from diverging from the target brightness than in cases in which the sensitivity correction coefficients are derived without reference to the aperture number.

Explanation has been given of a case in the second exemplary embodiment in which the target sensitivity is changed according to the currently set aperture number, however the present invention is not limited thereto. For example, the value of digital gain for the first and second images after correction may be changed according to the aperture number.

Moreover, according to circumstances, respective use may be made of the method of changing the brightness of the first and second images by changing the digital gain, and the method of changing the target sensitivity according to the aperture number as explained in the second exemplary embodiment. An example of such a case would be using the method of changing the brightness of the first and second images by changing the digital gain after shipping the imaging device 100A, and using the method of changing the target sensitivity according to the aperture number as explained in the second exemplary embodiment prior to shipping the imaging device 100A.

In the second exemplary embodiment, an example has been given of a case in which the sensitivity correction coefficients are derived based on the aperture number, however the present invention is not limited thereto, and the sensitivity correction coefficients may be derived based on an imaging condition other than aperture number. For example, the sensitivity correction coefficients may be derived according to the type of imaging lenses 16 actually employed for imaging. In such cases, the correction section 28C derives the sensitivity correction coefficients in consideration reference sensitivities according to the type of the imaging lenses 16. Namely, the correction section 28C computes the sensitivity ratios using reference sensitivities according to the type of the imaging lenses 16, and derives a linear approximation based on the computed sensitivity ratios. The sensitivity correction coefficients are then derived based on the derived linear approximation. The sensitivity correction coefficients may also be derived based on the color of the color filter 21 allocated to the first and second pixel groups. In such cases, the correction section 28C computes sensitivity ratios using the reference sensitivities according to the color of the allocated color filter 21 for each of the first and second pixel groups, and derives a linear approximation based on the computed sensitivity ratios. The correction section 28C then derives the sensitivity correction coefficients based on the derived linear approximation.

Third Exemplary Embodiment

Explanation has been given in the second exemplary embodiment of a case in which the sensitivity correction coefficients are generated based on target sensitivities according to each of predetermined plural aperture numbers. In the third exemplary embodiment, explanation follows regarding a case in which the aperture number currently set is an aperture number other than the predetermined plural aperture numbers. In the third exemplary embodiment, the same reference numerals are appended to configuration elements explained in the above exemplary embodiments, and explanation is omitted thereof.

Figure 24:
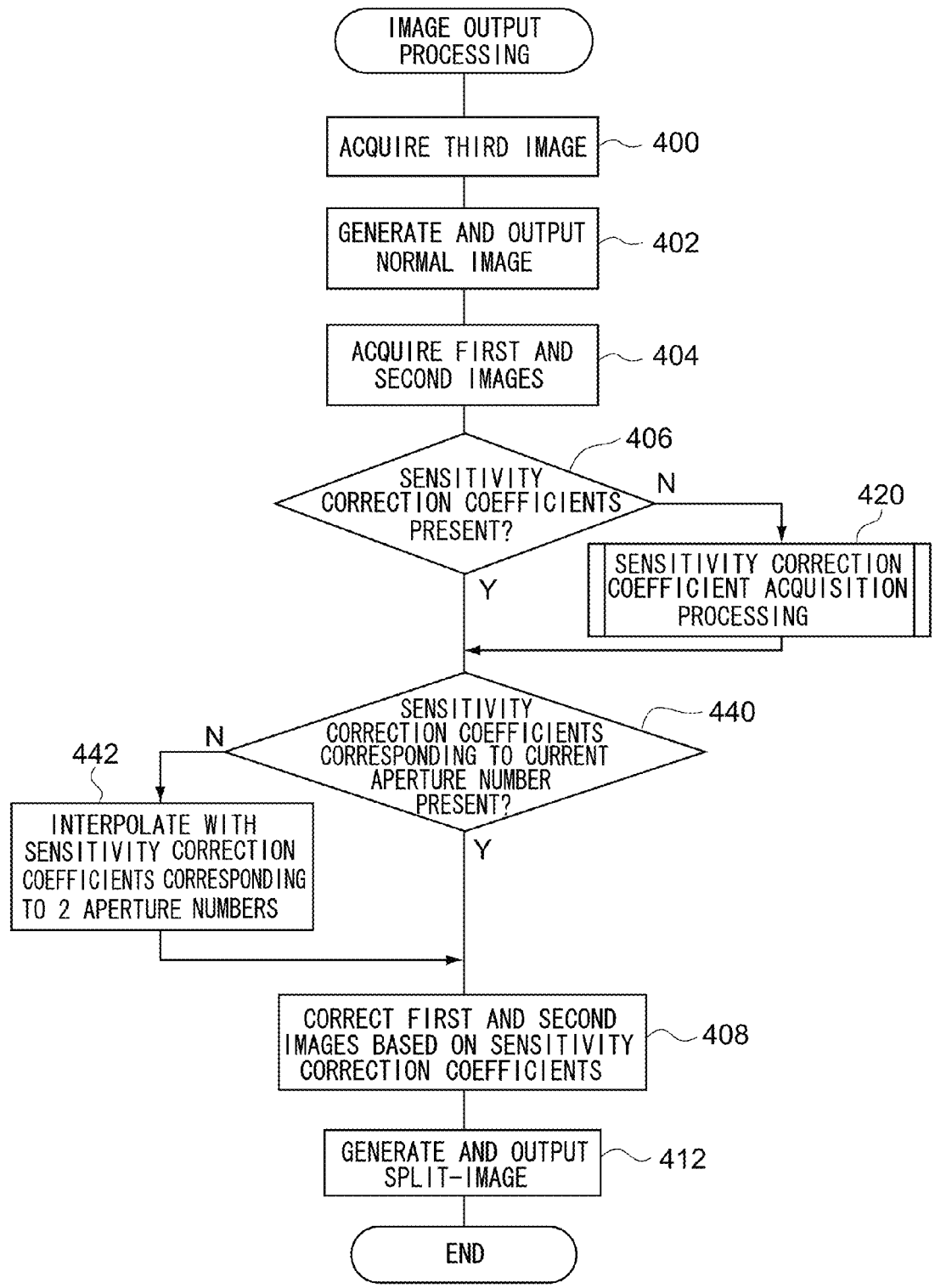
FIG. 24 is a flow chart illustrating an example of a flow of image output processing according to the third exemplary embodiment.

An imaging device 100B according to the third exemplary embodiment, as illustrated in FIG. 1, differs from the imaging device 100A according to the second exemplary embodiment in the point that, as illustrated in the example in FIG. 24, steps 440 and 442 are provided to the image output processing illustrated in FIG. 15 according to the second exemplary embodiment. In the following, for ease of explanation, explanation follows regarding a case in which F2.0 and F2.8 are employed as the predetermined plural aperture numbers. In the following, for ease of explanation, explanation follows regarding a case in which it is presumed the sensitivity correction coefficients corresponding to each of F2.0 and F2.8 are already stored in the memory 26 by the image processor 28 performing the sensitivity correction coefficient acquisition processing illustrated in FIG. 20 for F2.0 and F2.8.

At step 440 in the image output processing illustrated in FIG. 24, determination is made by the correction section 28C as to whether or not the sensitivity correction coefficients stored in the memory 26 are the sensitivity correction coefficients corresponding to the aperture number currently set. Affirmative determination is made at step 440 when the sensitivity correction coefficients stored in the memory 26 are the sensitivity correction coefficients corresponding to the aperture number currently set, and processing proceeds to step 408. Negative determination is made at step 440 when the sensitivity correction coefficients stored in the memory 26 are not the sensitivity correction coefficients corresponding to the aperture number currently set, and processing proceeds to step 442.

Figure 25:
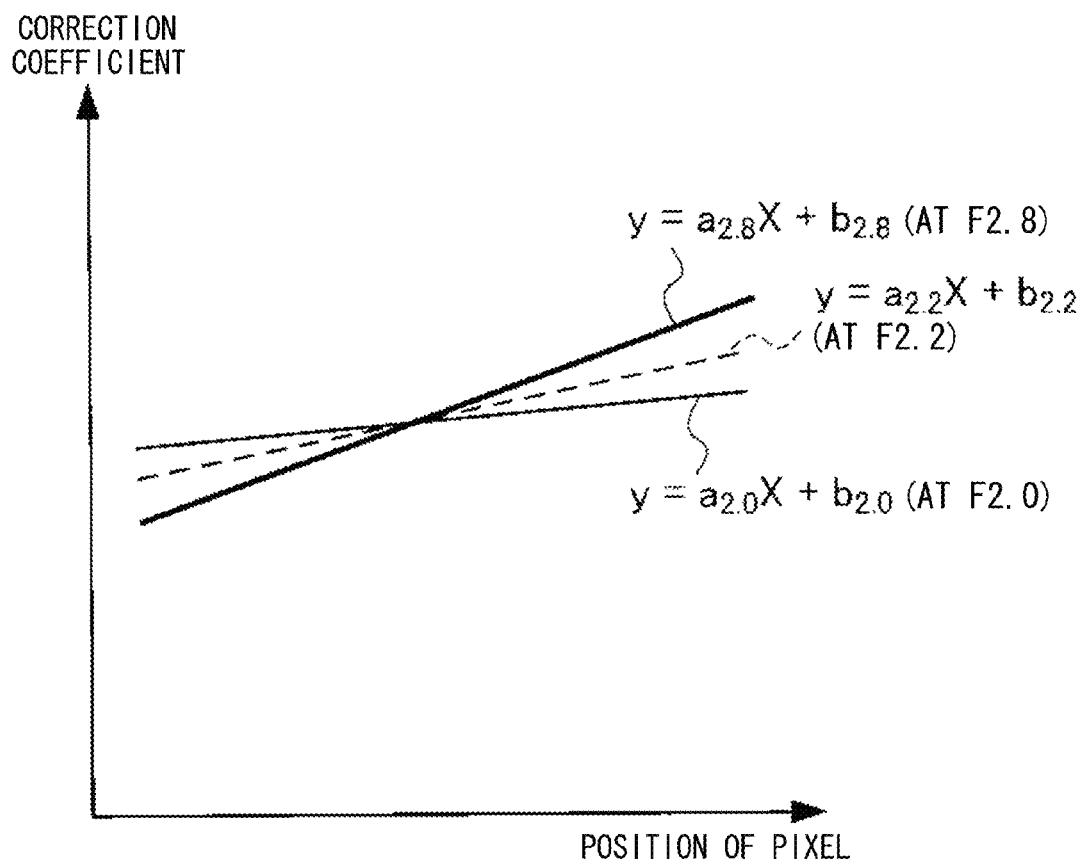
FIG. 25 is a graph illustrating an example of correction straight lines derived at F2.0, F2.2, and F2.8.

The sensitivity correction coefficients are uniquely derived from the correction straight line as explained in the above exemplary embodiments. In the third exemplary embodiment, as illustrated in the example in FIG. 25, the sensitivity correction coefficients at F2.0 are specified by a first order function of $y=a_{2.0}x+b_{2.0}$, and the sensitivity correction coefficients at F2.8 are specified by a first order function of $y=a_{2.8}x+b_{2.8}$.

Figure 26:
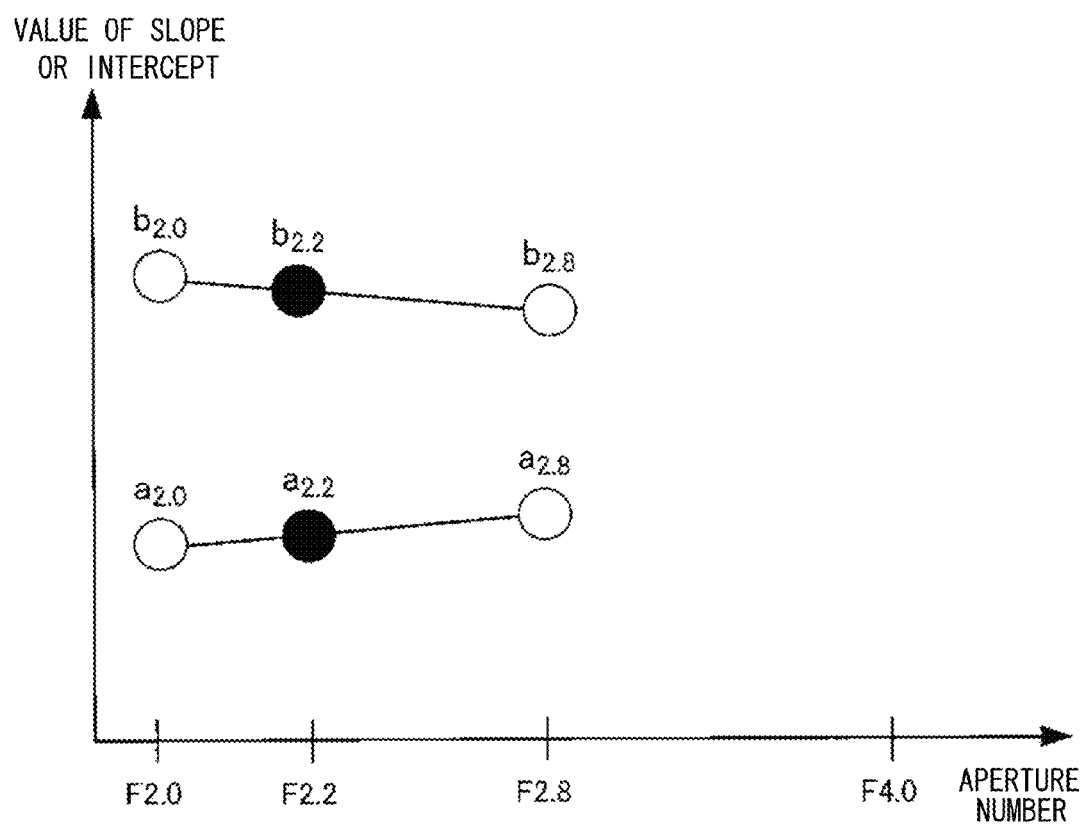
FIG. 26 is a graph illustrating an example of an interpolation method for sensitivity correction coefficients.

At step 422, the sensitivity correction coefficients according to the currently set aperture number are computed by the correction section 28C by interpolating between the sensitivity correction coefficients specified by the first order function of $y=a_{2.0}x+b_{2.0}$, and the sensitivity correction coefficients specified by the first order function of $y=a_{2.8}x+b_{2.8}$. For example, when the currently set aperture number is F2.2 then, as illustrated in the example in FIG. 25, the sensitivity correction coefficients are specified by the first order function of $y=a_{2.2}x+b_{2.2}$. In such cases, as illustrated in the example in FIG. 26, the correction section 28C computes each of the slope $a_{2.2}$ and the intercept $b_{2.2}$ as a linear interpolation. Namely, the slope $a_{2.2}$ is computed by the following Equation (5), and the intercept $b_{2.2}$ is computed by the following Equation (6).

$$a_{2.2}=(1-t) \times a_{2.0}\{\log_{\sqrt{2}}(2.2/2.0)\} \times a_{2.8} \qquad \text{Equation (5)}$$

$$b_{2.2}=(1-t) \times b_{2.0}\{\log_{\sqrt{2}}(2.2/2.0)\} \times b_{2.8} \qquad \text{Equation (6)}$$

Thus when the currently set aperture number is not one of the plural predetermined aperture numbers, the correction section 28C corrects the first and second images using sensitivity correction coefficients obtained by interpolating the sensitivity correction coefficients corresponding to two aperture numbers from out of the predetermined plural aperture numbers. The imaging device 100B according to the third exemplary embodiment is thereby capable of suppressing divergence due to aperture number in the brightness of the pixels included in both end portions in a direction corresponding to the pupil division direction of the split-image, from the target brightness, even in cases in which the aperture number is set as a step-less continuum.

Note that in the third exemplary embodiment, explanation has been given of a case in which 2 aperture numbers are employed as the predetermined plural aperture numbers, however the present invention is not limited thereto, and 3 or more aperture numbers may be employed. In such cases, interpolation may be performed using sensitivity correction coefficients already allocated to 2 aperture numbers closest to the aperture number currently set. Moreover, with 2 aperture numbers formed into respective pairs, the average value of the sensitivity correction coefficients obtained by performing interpolation for each of plural pairs may be employed to correct the brightness of the first and second images. In such cases, for example, interpolation is performed using the sensitivity correction coefficients already allocated to aperture numbers A and B from out of the aperture numbers A, B, C. Interpolation is also performed using the sensitivity correction coefficients already allocated to the aperture numbers A and C. Interpolation is also performed using the sensitivity correction coefficients already allocated to the aperture numbers B and C. The average values of the sensitivity correction coefficients obtained by each of these interpolations are then employed to correct the brightness of the first and second images.

Fourth Exemplary Embodiment

In each of the exemplary embodiments above, examples are given of the imaging device 100 (100A, 100B), however mobile terminal devices that are modified examples of the imaging device 100 include mobile phones and smartphones including a camera function. Other examples include personal digital assistants (PDAs) and mobile gaming machines. In the present fourth exemplary embodiment, detailed explanation follows regarding an example of a smartphone, with reference to the drawings.

Figure 27:
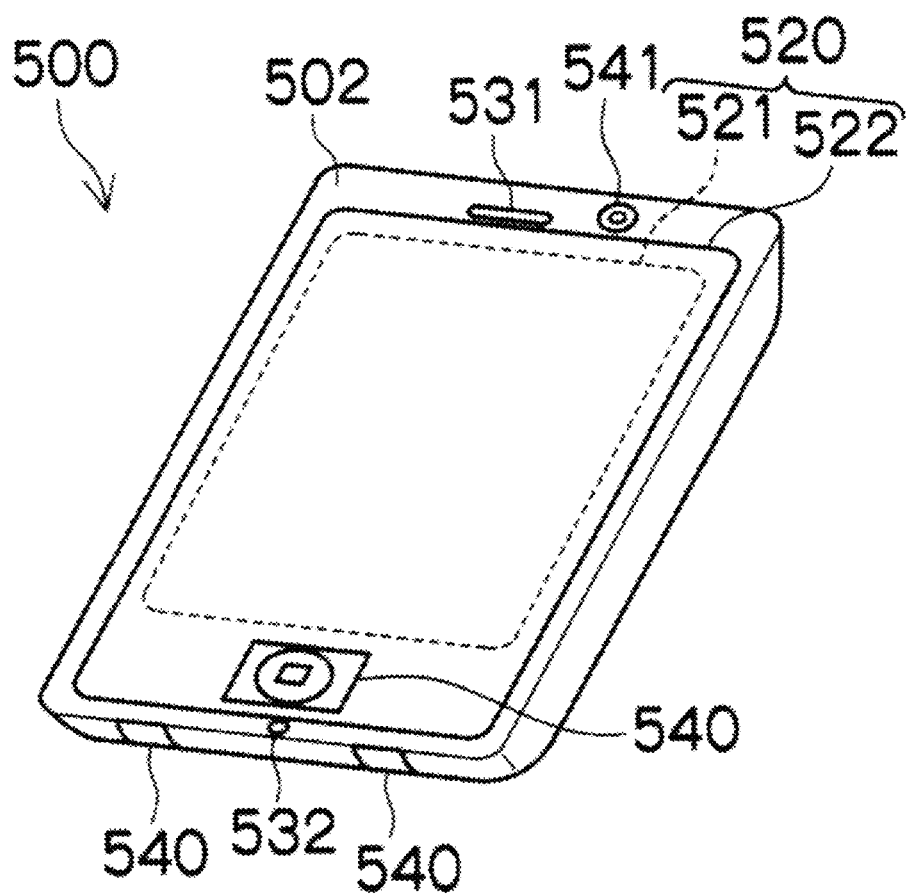
FIG. 27 is a perspective view illustrating an example of the external appearance of a smartphone according to a fourth exemplary embodiment.

FIG. 27 is a perspective view illustrating an example of the external appearance of a smartphone 500. The smartphone 500 illustrated in FIG. 27 includes a flat plate shaped casing 502, and a display and input section 520 provided on one face of the casing 502 and integrating together a display panel 521 serving as a display section and an operation panel 522 serving as an input section. The casing 502 includes a speaker 531, a microphone 532, an operation section 540, and a camera section 541. Note that the configuration of the casing 502 is not limited thereto, and, for example, a configuration may be employed in which the display section and the input section are provided independently from each other, and a configuration including a folding structure or a sliding structure may also be employed.

Figure 28:
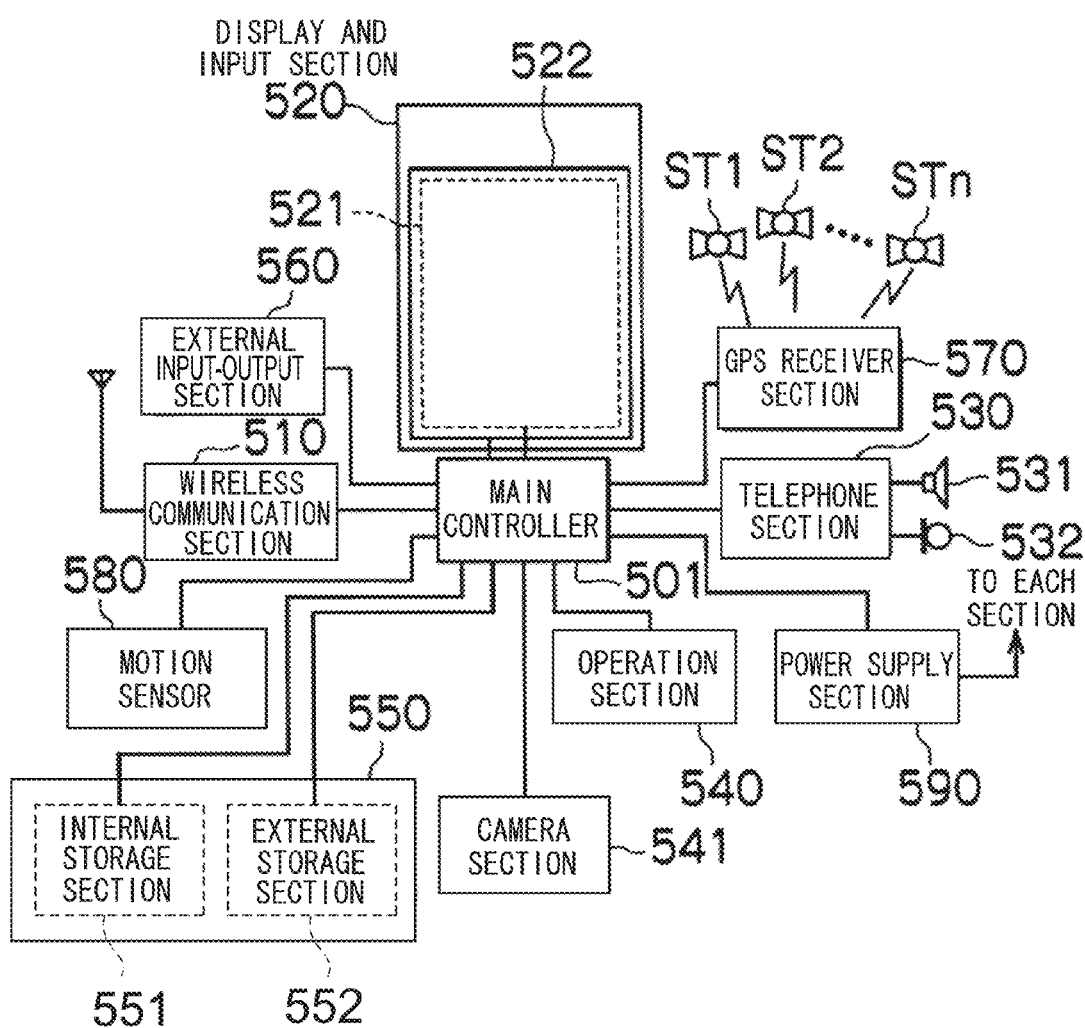
FIG. 28 is a block diagram illustrating an example of relevant configuration of an electrical system of a smartphone according to the fourth exemplary embodiment.

FIG. 28 is a block diagram illustrating an example of a configuration of the smartphone 500 illustrated in FIG. 27. As illustrated in FIG. 28, main configuration elements of the smartphone 500 include a wireless communication section 510, the display and input section 520, a telephone section 530, the operation section 540, the camera section 541, a storage section 550, and an external input-output section 560. Main configuration elements of the smartphone 500 also include a Global Positioning System (GPS) receiver section 570, a motion sensor 580, a power supply section 590, and a main controller 501. Main functions of the smartphone 500 include a wireless communication function that performs mobile wireless communication through a base station device BS and a mobile communication network NW.

The wireless communication section 510 performs wireless communication with the base station device BS installed in the mobile communication network NW according to instructions from the main controller 501. Transmission and reception of various types of file data, such as voice data and image data, email data etc., and reception of web data, streaming data, and the like is performed using the wireless communication.

The display and input section 520 is what is referred to as a touch panel, and includes the display panel 521 and the operating panel 522. Thus, according to control by the main controller 501, the display and input section 520 transmits information to a user visibly by displaying images (still images and video images), text data, and the like, and also detects user operation in response to the displayed information. The display panel 521 is preferably a 3D display panel in cases in which generated 3D is viewed.

The display panel 521 employs a display device such as an LCD, or an organic electroluminescence display (OELD). The operating panel 522 is a device that is installed such that an image displayed on the display screen of the display panel 521 is visible, and detects one or plural coordinates operated by a user finger or stylus. A detection signal generated by operation when such a device is operated by a user finger or stylus is output to the main controller 501. The main controller 501 then detects the operation position (coordinates) on the display panel 521 based on the detection signal received.

As illustrated in FIG. 27, the display panel 521 and the operation panel 522 of the smartphone 500 are integrated together to configure the display and input section 520, and the operation panel 522 is disposed so as to entirely cover the display panel 521. In cases in which such a placement is adopted, the operation panel 522 may include a function to detect user operation even in a region outside of the display panel 521. In other words, the operation panel 522 may include a detection region for a superimposed section superimposed on the display panel 521 (referred to below as the display region), and a detection region for an outer edge section other than the above that is not superimposed on the display panel 521 (referred to below as the non-display region).

The size of the display region and the size of the display panel 521 may completely match each other, however they do not necessarily match each other. The operating panel 522 may include two sensitive regions, at the outer edge section and at an inside portion other than the outer edge section. The width of the outer edge section is appropriately designed according to the size of the casing 502 and the like. Moreover, as a position detection method employed in the operating panel 522, any of, for example, a matrix switch method, a resistance film method, a surface acoustic wave method, an infrared radiation method, an electromagnetic induction method, an electrostatic capacitance method, or the like may be adopted.

The telephone section 530 includes the speaker 531 and the microphone 532. The telephone section 530 converts the voice of the user input through the microphone 532 into voice data capable of being processed by the main controller 501, then outputs this to the main controller 501. The telephone section 530 decodes voice data received by the wireless communication section 510 or by the external input-output section 560, and outputs the voice data from the speaker 531. As illustrated in FIG. 27, for example, the speaker 531 may be installed in the same face as the face at which the display and input section 520 is provided, and the microphone 532 may be installed in a side face of the casing 502.

The operation section 540 is a hardware key that employs a key switch or the like, and is a section that receives instructions from a user. For example, as illustrated in FIG. 27, the operation section 540 is installed to a side face of the casing 502 of the smartphone 500, and is a push-button type switch that is switched ON by depressing with a finger or the like, and is switched to an OFF state when the finger is removed by restoring force, such as from a spring.

The storage section 550 is stored with a control program and control data for the main controller 501, application software, address data that corresponds names against telephone numbers of communication partners, and data of sent and received emails. The storage section 550 stores web data downloaded by web browsing, and downloaded content data. The storage section 550 also temporarily stores streaming data and the like. The storage section 550 includes an internal storage section 551 installed within the smartphone, and an external storage section 552 including a detachable external memory slot. The internal storage section 551 and the external storage section 552 configuring the storage section 550 are implemented using a storage medium, such as a flash memory type or a hard disk type. Other examples that may be employed as the storage medium include a multimedia card micro type, a card type memory (such as a MICRO SD (registered trademark) memory or the like), Random Access Memory (RAM), or Read Only Memory (ROM).

The external input-output section 560 serves the role of an interface to all external devices coupled to the smartphone 500, and is employed for communication and the like with other external devices, or for direct or indirect connection by a network. Examples of communication or the like with other external devices include a universal serial bus (USB), and IEEE1394. Examples of networks include the internet, wireless LAN, BLUETOOTH (registered trademark), radio frequency identification (RFID), and infrared data association (IrDA, (registered trademark)) communication. Other examples of networks include ULTRA WIDEBAND (UWB, (registered trademark)), and ZIGBEE (registered trademark).

External devices coupled to the smartphone 500 include, for example, wired/wireless headsets, wired/wireless external chargers, a wired/wireless data port, and/or a memory card connected through a card socket. Other examples of external devices include a subscriber identity module (SIM) card, a user identity module (UIM) card, and an external audio/video device connected through an audio/video input/output (I/O) terminal. Examples of other external audio/video devices include wirelessly connected external audio/video devices. In place of an external audio/video device, for example, a wired/wirelessly connected smartphone, a wired/wirelessly connected PDA, a wired/wirelessly connected personal computer, or earphones or the like may also be applied.

The external input-output section is capable of transmitting received data transmitted by such external devices to each of the configuration elements within the smartphone 500, and capable of transmitting data within the smartphone 500 to the external devices.

Under instruction from the main controller 501, the GPS receiver section 570 receives GPS signals transmitted from GPS satellites ST1 to STn and executes position computation processing based on plural received GPS signals to detect the position in latitude, longitude, and altitude of the smartphone 500. The GPS receiver section 570 is also capable of detecting the position by using positional data when it is possible to acquire positional data from the wireless communication section 510 or the external input-output section 560 (such as a wireless LAN).

The motion sensor 580 includes, for example, a triaxial acceleration sensor, and detects physical movement of the smartphone 500 according to instruction from the main controller 501. The movement direction and acceleration of the smartphone 500 is detected by detecting the physical movement of the smartphone 500. The detection result is output to the main controller 501.

The power supply section 590 supplies electrical power accumulated in a battery (omitted from illustration in the drawings) to each of the sections of the smartphone 500 under instruction from the main controller 501.

The main controller 501 includes a microprocessor, and operates according to a control program and control data stored in the storage section 550 so as to integrally control each of the sections of the smartphone 500. In order to perform voice communication and data communication through the wireless communication section 510, the main controller 501 includes a mobile communication control function that controls each of the sections of the communication system, and an application processing function.

The application processing function is implemented by the main controller 501 operating according to application software stored in the storage section 550. Examples of application processing functions include an infrared communication function that controls the external input-output section 560 to perform data communication with a counter-party device, an email function that performs email transmission and reception, and a web browsing function that views web pages.

The main controller 501 includes an image processing function that displays a picture on the display and input section 520, or the like, based on image data (still image or video image data) such as received data or downloaded streaming data. The image processing function is a function in which the main controller 501 decodes the above image data, subjects the decoded result to image processing, and displays the image on the display and input section 520.

The main controller 501 also executes display control of the display panel 521, and operation detection control to detect user operation through the operation section 540 and the operating panel 522.

By executing display control the main controller 501 displays icons to startup application software, and software keys such as scroll bars, or displays windows to generate emails. Scroll bars are software keys to receive instructions to move the display portion of an image such as large images that cannot be accommodated within the display region of the display panel 521.

By executing the operation detection control, the main controller 501 detects user operation through the operation section 540, and receives, through the operating panel 522, input of operations to the above icons, and input of character sequences to the entry field of the above window. By execution of the operation detection control, the main controller 501 receives scroll demands for display images through the scroll bar.

Moreover, by executing the operation detection control, the main controller 501 determines whether the operation position on the operating panel 522 is in the superimposed section superimposed on the display panel 521 (display region), or in the other outer edge section not superimposed on the display panel 521 (non-display region). The main controller 501 also includes a touch panel control function to receive the determination result, and to control the display position of the sensitive region of the operating panel 522 and the display position of the software key.

The main controller 501 detects gesture operations to the operating panel 522, and is capable of executing a preset function according to the detected gesture operation. Gesture operation does not mean a simple conventional touch operation, and means tracing a track with a finger or the like, specifying plural positions at the same time, or combinations thereof, and means an operation to trace a track of at least one from plural positions.

The camera section 541 is a digital camera that captures an image using an image pick-up device such as a CMOS or CCD, and includes functions similar to those of the imaging device 100 as illustrated in FIG. 1 and the like.

The camera section 541 is capable of switching between a manual focus mode and an automatic focus mode. When the manual focus mode has been selected, focusing of the imaging lens of the camera section 541 can be performed by operating a focus icon button or the like displayed on the operation section 540 or the display and input section 520. Moreover, during manual focus mode, a live-view image synthesized with a split-image is displayed on the display panel 521, thereby enabling the focus state to be verified during manual focus. The HYBRID FINDER 220 illustrated in FIG. 9 may be provided to the smartphone 500.

The camera section 541, under control of the main controller 501, converts image data obtained by image capture into, for example, compressed image data such as joint photographic coding experts group (JPEG). Then the image data obtained by conversion can be stored in the storage section 550, and output through the input-output section 560 and the wireless communication section 510. In the smartphone 500 illustrated in FIG. 27, the camera section 541 is installed to the same face as the display and input section 520; however the installation position of the camera section 541 is not limited thereto, and installation may be made to the back face of the display and input section 520, or plural of the camera sections 541 may be installed. In cases in which plural of the camera sections 541 are installed, image capture may be performed independently by switching the camera section 541 with image capture, or image capture may be performed using plural of the camera sections 541 at the same time.

The camera section 541 may also be utilized by various functions of the smartphone 500. For example, images acquired with the camera section 541 may be displayed on the display panel 521, and an image of the camera section 541 may be utilized as an operation input to the operating panel 522. During position detection by the GPS receiver section 570, the position may be detected with reference to an image from the camera section 541. Moreover, the optical axis direction of the camera section 541 of the smartphone 500 may be determined and the present usage environment may be determined by reference to an image from the camera section 541, either without using the triaxial acceleration sensor, or in combination with using the triaxial acceleration sensor. Obviously the image from the camera section 541 may be utilized in application software.

It is also possible for various data to be added to the image data of still images or video images and stored in the storage section 550, and output through the input-output section 560 and the wireless communication section 510. Reference here to "various data" is, for example, positional data acquired by the GPS receiver section 570, and voice data acquired by the microphone 532 (which may be speech converted to text data arising from text conversion performed by the main controller or the like), for adding to image data of still images or video images. It may moreover be orientation data acquired by the motion sensor 580, and so on.

Moreover, although each of the above exemplary embodiments an example has been given in which the split-images are divided in two in the up-down direction, there is no limitation thereto, and a split-image configuration may be applied of an image divided into plural divisions along the left-right direction or a diagonal direction.

Figure 29:
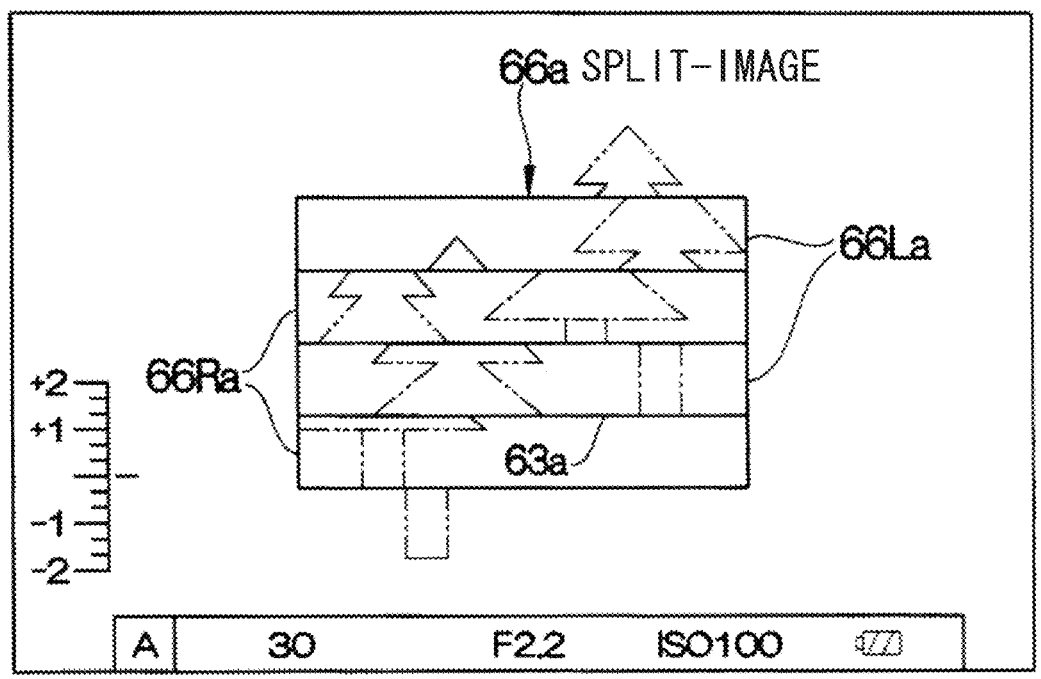
FIG. 29 is a schematic diagram illustrating a modified example of a split-image according to the first to the fourth exemplary embodiments, and is an example of a split-image formed by splitting and placing alternate odd lines and even lines of a first image and a second image in a row.

A split-image 66a illustrated in the example in FIG. 29 is divided into odd numbered lines and even numbered lines by plural dividing lines 63a parallel to the row direction. In the split-image 66a, line shaped (for example strip shaped) phase difference images 66La generated based on the output signal output from the first pixel group are displayed on the odd numbered lines (or on the even numbered lines). Line shaped (for example strip shaped) phase difference images 66Ra generated based on the output signal output from the second pixel group are displayed on the even numbered lines.

Figure 30:
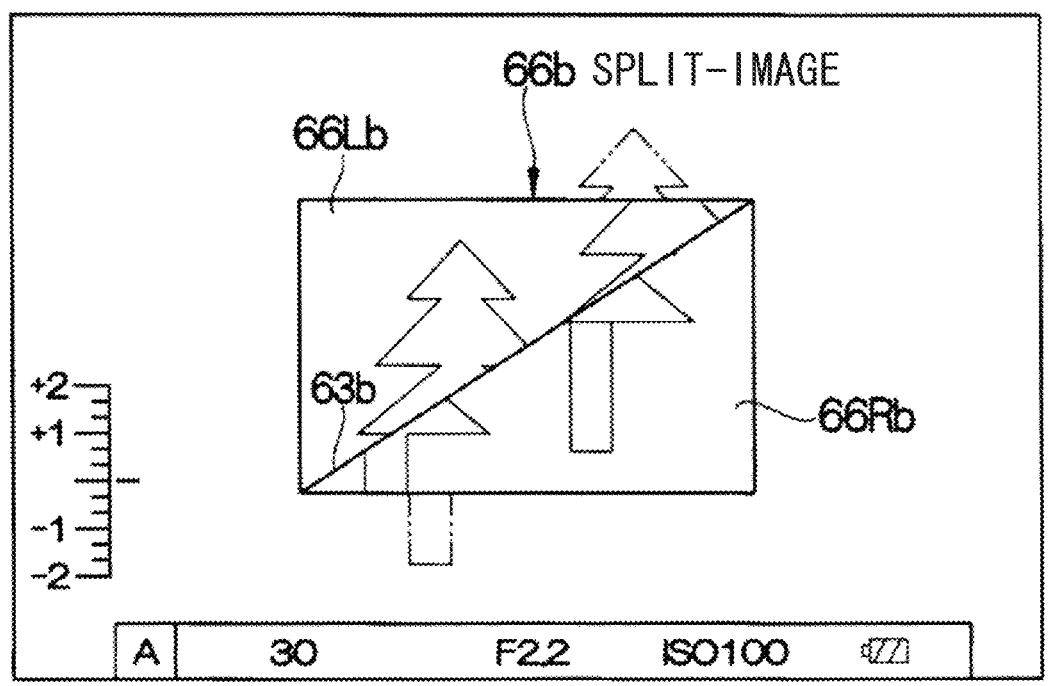
FIG. 30 is a schematic diagram illustrating a modified example of a split-image according to the first to the fourth exemplary embodiments, and is an example of a split-image divided along a sloping dividing line inclined with respect to a row direction.

A split-image 66b illustrated in FIG. 30 is divided into two by a dividing line 63b with slope angled with respect to the row direction (for example a diagonal line of the split-image 66b). In the split-image 66b, a phase difference image 66Lb generated based on the output signal output from the first pixel group is displayed in one region. A phase difference image 66Rb generated based on the output signal output from the second pixel group is displayed in the other region.

Figure 31A:
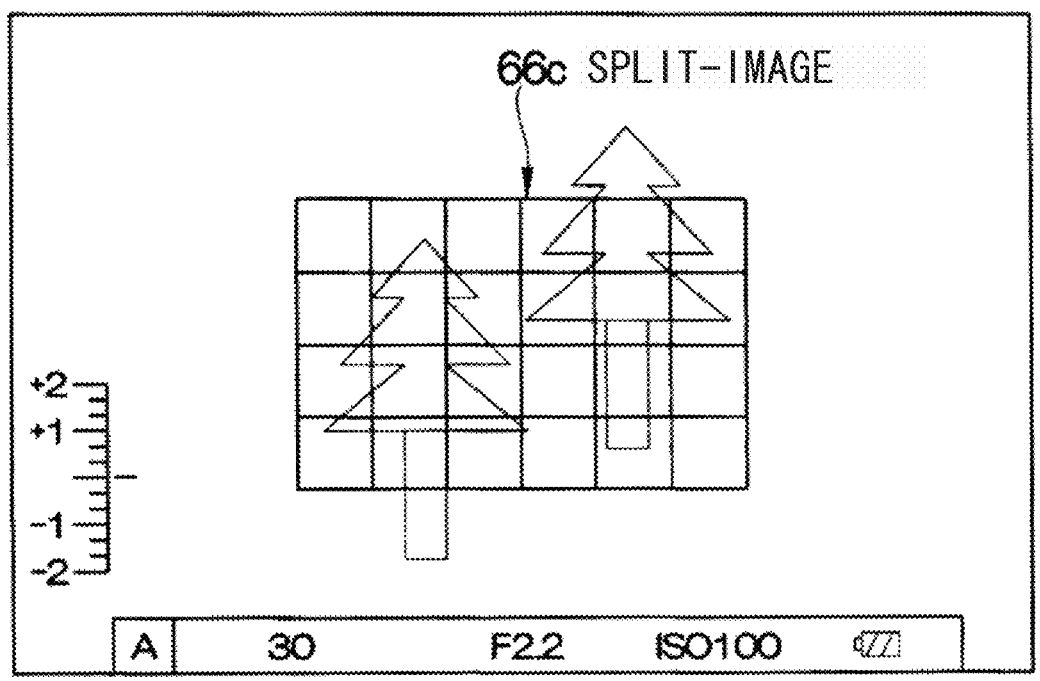
FIG. 31A is a schematic diagram illustrating a modified example of a split-image according to the first to the fourth exemplary embodiments, and is an example of a split-image divided by lattice shaped dividing lines.
Figure 31B:
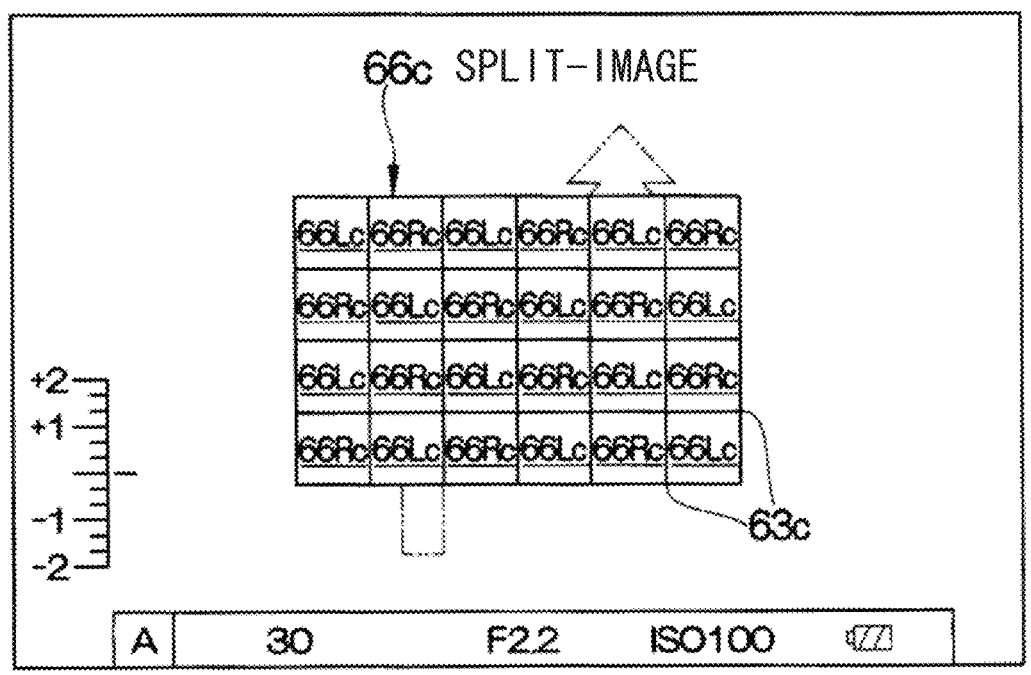
FIG. 31B is a schematic diagram illustrating a modified example of a split-image according to the first to the fourth exemplary embodiments, and is an example of a split-image formed in a chess-board pattern.

A split-image 66c illustrated in FIG. 31A and FIG. 31B is divided by lattice shaped dividing lines 63c parallel to the row direction and column direction, respectively. In the split-image 66c, a phase difference image 66Lc generated based on the output signals output from the first pixel group is displayed arranged in a chess board pattern (checkered pattern). A phase difference image 66Rc generated based on an output signal output from the second pixel group is also displayed arranged in a chess board pattern.

Moreover, there is no limitation to a split-image, and another focus verification image may be generated from the two phase difference images, and the focus verification image displayed. For example, the two phase difference images may be superimposed on each other in a synthesized display, so as to display as a double image when not in focus and to display as a clear image when in a focused state.

In each of the above exemplary embodiments, an example is given in which the image pick-up device 20 includes the first to third pixel groups, however the present invention is not limited thereto, and an image pick-up device configured from only a first pixel group and a second pixel group may be employed. A digital camera including such a type of image pick-up device is capable of generating a three dimensional image (3D image) based on the first image output from the first pixel group and the second image output from the second pixel group, and is also capable of generating a two dimensional image (2D image). In such cases, generation of the two dimensional image is, for example, performed by interpolation processing between pixels of the same color in each of the first image and the second image. The first image or the second image may also be employed as the two dimensional image without performing interpolation processing.

In each of the above exemplary embodiments, examples have been given in which both the normal image and the split-image are displayed at the same time on the same screen of a display device when the first to the third images are input to the image processor 28, however the present invention is not limited thereto. For example, the display controller 36 may control so as to inhibit continuous display of the normal image as a video image on the display device, and to continuously display the split-image as a video image on the display device. Reference here to "inhibit . . . display of the normal image" means, for example, that the normal image is not displayed on the display device. More specifically, is means not displaying the normal image on the display device by not outputting the normal image to the display device even though the normal image is generated, and also not displaying the normal image on the display device by not generating the normal image. The split-image may also be displayed on the display device by using the whole of the screen, or the split-image may be displayed by using the whole of a split-image display region as illustrated as an example in FIG. 12. Reference here to "split-image" is, in cases in which a specific image pick-up device is employed, for example a split-image based on images output from phase difference pixel groups (for example the first image output from the first pixel group and the split-image output from the second pixel group). An example of "cases in which a specific image pick-up device is employed" is a case in which an image pick-up device is employed that is configured by only phase difference pixel groups (for example the first pixel group and the second pixel group). Another example is a case in which an image pick-up device is employed that has phase difference pixels (for example the first pixel group and the second pixel group) arranged at a specific proportion with respect to the normal pixels.

Moreover, there are various conceivable conditions as conditions to inhibit display of the normal image and to display the split-image. For example, the display controller 36 may perform control to display the split-image without displaying the normal image on the display device in cases in which a normal image display instruction is cancelled in a state in which display of a split-image is being instructed. Moreover, for example, the display controller 36 may perform control to display the split-image without displaying the normal image on the display device in cases in which a photographer is looking into the HYBRID FINDER. Moreover, for example, the display controller 36 may perform control to display the split-image without displaying the normal image on the display device in cases in which the release button 211 is in a half pressed state. Moreover, for example, the display controller 36 may perform control to display the split-image without displaying the normal image on the display device in cases in which press operation of the release button 211 is not being performed. Moreover, for example, the display controller 36 may perform control to display the split-image without displaying the normal image on the display device in cases in which a face detection function has been activated to detect faces in an subject-image.

The imaging device 100 (100A, 100B) explained in each of the above exemplary embodiments may have a function to confirm the depth of field (depth of field confirmation function). In such cases, for example, the imaging device 100 includes a depth of field confirmation key. The depth of field confirmation key may be a hardware key or may be a software key. In cases in which instruction is by a hardware key, preferably, for example, a momentary operation switch (non-hold switch) is applied. Reference here to a momentary operation switch denotes, for example, a switch that maintains a specific operation state of the imaging device 100 only while pressed to a specific position. A depth of field confirmation key changes the aperture number on pressing. While continuous pressing is being performed on the depth of field confirmation key (while being pressed to the specific position), the aperture number continues to change until a limit aperture number is reached. Thus due to the aperture number changing while the depth of field confirmation key is being pressed, the phase difference required to obtain a split-image is sometimes not obtainable. Thus configuration may be made such that when the depth of field confirmation key is pressed in a state in which a split-image is being displayed, during pressing the CPU 12 changes from the split-image to a normal live-view display, and then switches the screen image so as to display the split-image again when the pressed state has been released. Explanation has been given of cases in which a momentary operation switch is applied as an example of the depth of field confirmation key, however there is no limitation thereto, and an alternating operation switch (hold switch) may be applied.

The flows of the image output processing (see FIG. 15 and FIG. 24) explained in each of the above exemplary embodiments are merely examples thereof. Accordingly, it goes without saying that steps not required may be eliminated, new steps may be added, and the processing sequence may be rearranged within a range not departing from the spirit. Each type of processing included in the image output processing and sensitivity correction coefficient acquisition processing explained for each of the above exemplary embodiments may be realized by a software configuration utilizing a computer by executing a program, or may be realized by a hardware configuration. Implementation may also be made with a combination of a hardware configuration and a software configuration.

Note that in the image output processing explained in each of the above exemplary embodiments, in cases in which implementation is by executing a program with a computer, the program may be pre-stored in a specific storage region (for example the memory 26). Initial storage in the memory 26 is not always necessary. For example, a program may first be stored on a freely selectable "portable storage medium" such as a Solid State Drive (SSD), CD-ROM, a DVD disk, a magneto optical disk, or an IC card, employed connected to a computer. A computer may then acquire and execute a program from such a portable storage medium. Each program may also be stored in advance on another computer, server device, or the like connected to a computer through the internet, a Local Area Network (LAN), or the like, such that the computer acquires and executes such programs therefrom.

The invention claimed is:

1. An image processing device comprising:
   an image acquisition section that acquires a first image and a second image, based on a first image signal and a second image signal that are output from an image pick-up device that includes a first pixel group and a second pixel group that output the first and second image signals due to respective images being formed by a pupil-divided subject-image that has passed through a first region and a second region of an imaging lens;
   a sensitivity acquisition section that acquires sensitivity to light incident through the first region of pixels in a pupil division direction of the first pixel group, and acquires sensitivity to light incident through the second region of pixels in the pupil division direction of the second pixel group;
   a correction section that derives linearly approximated sensitivity correction coefficients for each of the first image and the second image based on the sensitivities acquired by the sensitivity acquisition section, and corrects brightnesses of the first and second images based on the derived sensitivity correction coefficients;
   a generation section that generates a first display image based on an image signal that is output from the image pick-up device, and generates a second display image, for use in focus verification, based on the first and second images corrected by the correction section;
   a display section that displays images; and
   a display controller that performs control to continuously display the first display image, that is generated by the generation section, as a video image on the display section, and to continuously display the second display image, that is generated by the generation section, as a video image within a display region of the first display image.

2. An image processing device comprising:
   an image acquisition section that acquires a first image and a second image, based on a first image signal and a second image signal that are output from an image pick-up device that include a first pixel group and a second pixel group that output the first and second image signals due to respective images being formed by a pupil-divided subject-image that has passed through a first region and a second region of an imaging lens;
   a sensitivity acquisition section that acquires sensitivity to light incident through the first region of pixels in a pupil division direction of the first pixel group, and acquires sensitivity to light incident through the second region of pixels in the pupil division direction of the second pixel group;
   a correction section that derives linearly approximated sensitivity correction coefficients for each of the first image and the second image based on the sensitivities acquired by the sensitivity acquisition section, and corrects brightnesses of the first and second images based on the derived sensitivity correction coefficients;
   a generation section that generates a first display image based on an image signal that is output from the image pick-up device, and generates a second display image, for use in focus verification, based on the first and second images corrected by the correction section;
   a display section that displays images; and
   a display controller that performs control to inhibit continuous display of the first display image, that is generated by the generation section, as a video image using the display section, and to continuously display on the display section the second display image, that is generated by the generation section, as a video image.

3. The image processing device of claim 1, wherein the sensitivity correction coefficients are used to make a sensitivity difference between corresponding pixels in a center portion in the pupil division direction of each of the first and second pixel groups smaller than a sensitivity difference between corresponding pixels included in both end portions in the pupil division direction of each of the first and second pixel groups.

4. The image processing device of claim 1, wherein the correction section uses the sensitivity correction coefficients to correct the brightnesses of the first and second images that are acquired by the image acquisition section, and adjusts the corrected brightnesses by multiplying them by a specific coefficient.

5. The image processing device of claim 1, wherein the correction section derives the sensitivity correction coefficients based on an imaging condition, and employs the derived sensitivity correction coefficients to correct the brightnesses of the first and second images that are acquired by the image acquisition section.

6. The image processing device of claim 5, wherein the correction section derives the sensitivity correction coefficients with reference to a target sensitivity that is determined based on the imaging condition, and uses the derived sensitivity correction coefficients to correct the brightnesses of the first and second images that are acquired by the image acquisition section.

7. The image processing device of claim 6, wherein:
   the imaging condition is an aperture number; and
   in a state in which the sensitivity correction coefficients have been pre-derived with reference to the target sensitivity for each of a plurality of predetermined aperture numbers, in a case in which first and second images are acquired by the image acquisition section based on an aperture number other than the plurality of aperture numbers, the correction section interpolates the sensitivity correction coefficients for each of at least 2 aperture numbers in the plurality of aperture numbers, and uses the sensitivity correction coefficients after interpolation to correct the brightnesses of the first and second images acquired by the image acquisition section.

8. The image processing device of claim 1, wherein the sensitivity acquisition section acquires the sensitivities of a plurality of pixels included in a center portion in the pupil division direction of each of the first and second pixel groups.

9. The image processing device of claim 1, wherein:
the image pick-up device further includes a third pixel group, on which an image of a subject-image that has passed through the imaging lens is formed without being pupil-divided, that outputs a third image signal; and
the generation section generates the first display image based on the third image signal that is output from the third pixel group.

10. An imaging device comprising:
the image processing device of claim 1;
the image pick-up device including the first and second pixel groups; and
a storage section that stores images that are generated based on image signals that are output from the image pick-up device.

11. An image processing method comprising:
acquiring a first image and a second image, based on a first image signal and a second image signal that are output from an image pick-up device that includes a first pixel group and a second pixel group that output the first and second image signals due to respective images being formed by a pupil-divided subject-image that has passed through a first region and a second region of an imaging lens;
acquiring sensitivity to light incident through the first region of pixels in a pupil division direction of the first pixel group, and acquiring sensitivity to light incident through the second region of pixels in the pupil division direction of the second pixel group;
deriving linearly approximated sensitivity correction coefficients for each of the first image and the second image based on the acquired sensitivities, and correcting brightnesses of the first and second images based on the derived sensitivity correction coefficients;
generating a first display image based on an image signal that is output from the image pick-up device, and generating a second display image, for use in focus verification, based on the corrected first and second images; and
performing control to continuously display the generated first display image as a video image on a display section that displays images, and to continuously display the generated second display image as a video image within a display region of the first display image.

12. An image processing method comprising:
acquiring a first image and a second image, based on a first image signal and a second image signal that are output from an image pick-up device that includes a first pixel group and a second pixel group that output the first and second image signals due to respective images being formed by a pupil-divided subject-image that has passed through a first region and a second region of an imaging lens;
acquiring sensitivity to light incident through the first region of pixels in a pupil division direction of the first pixel group, and acquiring sensitivity to light incident through the second region of pixels in the pupil division direction of the second pixel group;
deriving linearly approximated sensitivity correction coefficients for each of the first image and the second image based on the acquired sensitivities, and correcting brightnesses of the first and second images based on the derived sensitivity correction coefficients;
generating a first display image based on an image signal that is output from the image pick-up device, and generating a second display image, for use in focus verification, based on the corrected first and second images; and
performing control to inhibit continuous display of the generated first display image as a video image using a display section, and to continuously display on the display section the generated second display image as a video image.

13. A non-transitory computer-readable storage medium storing a program for causing a computer to function as the image acquisition section, the sensitivity acquisition section, the correction section, and the display controller of the image processing device of claim 1.

* * * * *